(12) United States Patent
Hayashi

(10) Patent No.: US 9,473,653 B2
(45) Date of Patent: Oct. 18, 2016

(54) IMAGE READING APPARATUS

(71) Applicant: PFU Limited, Ishikawa (JP)

(72) Inventor: Ryo Hayashi, Ishikawa (JP)

(73) Assignee: PFU Limited, Ishikawa (JP)

( * ) Notice: Subject to any disclaimer, the term of this patent is extended or adjusted under 35 U.S.C. 154(b) by 48 days.

(21) Appl. No.: 14/641,110

(22) Filed: Mar. 6, 2015

(65) Prior Publication Data

US 2016/0134787 A1     May 12, 2016

(30) Foreign Application Priority Data

Nov. 12, 2014   (JP) ................................ 2014-230127

(51) Int. Cl.
*H04N 1/00*      (2006.01)
*H04N 5/235*     (2006.01)

(52) U.S. Cl.
CPC ........ *H04N 1/00519* (2013.01); *H04N 5/2354* (2013.01)

(58) Field of Classification Search
CPC ..................... H04N 1/00519; H04N 1/00997; H04N 5/2354
USPC .......................................... 348/373–376, 370
See application file for complete search history.

(56) References Cited

U.S. PATENT DOCUMENTS

| 2007/0081210 A1* | 4/2007 | Wilkinson | ............... G03H 1/22 359/18 |
| 2013/0286665 A1 | 10/2013 | Yoo | |
| 2015/0031412 A1* | 1/2015 | Quilter | .................. G06F 19/366 455/556.1 |

FOREIGN PATENT DOCUMENTS

| JP | 9-233265 A | 9/1997 |
| JP | 2001-4811 A | 1/2001 |
| JP | 2002-006451 A | 1/2002 |
| JP | 2004-184639 A | 7/2004 |
| JP | 2005-181598 A | 7/2005 |
| JP | 2009-134286 A | 6/2009 |
| JP | 2010-139668 A | 6/2010 |
| JP | 2012-042902 A | 3/2012 |

OTHER PUBLICATIONS

Japanese Decision of a Patent Grant issued in Application No. 2014-230127, mailed Dec. 1, 2015, with English Translation.

\* cited by examiner

*Primary Examiner* — Nhan T Tran
*Assistant Examiner* — Chan Nguyen
(74) *Attorney, Agent, or Firm* — McDermott Will & Emery LLP

(57) ABSTRACT

An image reading apparatus comprises a housing to block ambient light and including a rectangular opening on a bottom, an image capturing unit to capture an image of a medium in the opening, and a plurality of light sources disposed in the housing and emitting light to irradiate different areas of the opening. The housing includes four cover portions corresponding to sides of the rectangular opening. The four cover portions include a pair of inclined-cover portions which are switched between an open state and a folded state and a pair of connecting-cover portions which connect the two inclined-cover portions. The two connecting-cover portions are connected to the inclined-cover portions in a transformable manner, and when the two inclined-cover portions are in the folded state, the connecting-cover portions enter gap between the inclined-cover portions by being transformed with respect to the inclined-cover portions.

6 Claims, 30 Drawing Sheets

FIG.1
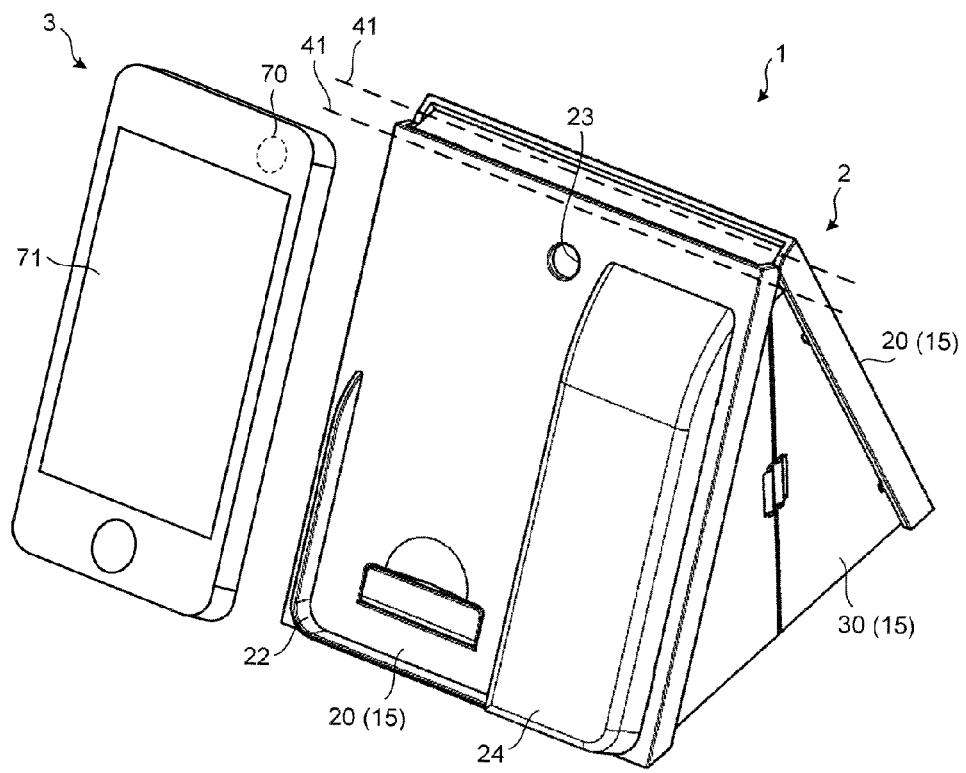
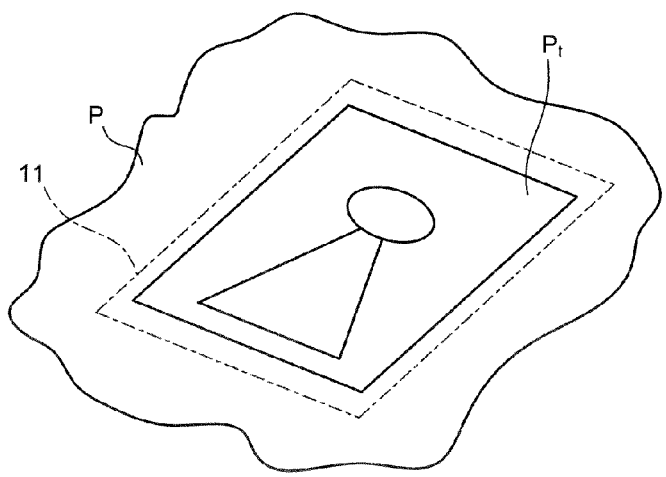

IMAGE READING APPARATUS

CROSS-REFERENCE TO RELATED APPLICATION(S)

The present application claims priority to and incorporates by reference the entire contents of Japanese Patent Application No. 2014-230127 filed in Japan on Nov. 12, 2014.

BACKGROUND OF THE INVENTION

1. Field of the Invention

The present invention relates to an image reading apparatus.

2. Description of the Related Art

In the case of capturing an image of an object by an image capturing device, the image is captured by receiving light reflected at the object by the image capturing device. However, in the case where the image capturing device receives the light specularly reflected at the object or the light reflected at any matter other than the object, there are cases where the image capturing device cannot capture the object properly. Therefore, among the image capturing devices in related arts, some image capturing devices are configured to prevent any light other than the light to properly capture the object from being received by covering a periphery of a light receiving lens at the image capturing device with a lens hood (for example, refer to Japanese Patent Application Laid-open No. 2012-42902). Further, alight shielding member such as the lens hood to cover the periphery of the light receiving lens tends to be large-sized, and therefore, portability of the light shielding member may be deteriorated even in a case where the image capturing device is handheld size. Therefore, the lens hood recited in the Japanese Patent Application Laid-open No. 2012-42902 is foldable in order to secure portability as well.

Here, in the case of capturing an image of a medium for the purpose of reading an image by capturing an image printed on a paper medium or the like also, the image of the medium or the like is read by reflecting light emitted from a surrounding area of the medium to the medium at the medium and receiving the light by the image capturing device. In the case of thus reading the image by capturing the image of the medium, there may be a case where high image quality is demanded. But, in the case of capturing the image of the medium by the ambient light, quality of a read image may be varied by a light amount, a color of light, a light direction, etc. of ambient light. Therefore, it is quite difficult to read the image, securing portability of an entire apparatus including a light shielding member in order to read the image while ensuring the image quality.

SUMMARY OF THE INVENTION

It is an object of the present invention to at least partially solve the problems in the conventional technology.

According to an aspect of the invention, an image reading apparatus comprises a housing to block ambient light, the housing including an opening portion on a bottom surface; an image capturing unit configured to capture an image of a medium exposed to an inner portion of the housing at the opening portion; and a plurality of light sources disposed at the inner portion of the housing and emitting light to the opening portion to irradiate different areas on a horizontal surface of the opening portion.

The opening portion is formed in a rectangular shape, and the housing includes four cover portions corresponding to sides of the opening portion.

The four cover portions include two pairs of cover portions, each pair of the two pairs of cover portions includes two cover portions facing each other, one pair of the cover portions out of the two pairs of the cover portions constitute inclined-cover portions such that each of the one pair of the cover portions is inclining in a direction approaching toward other one of the one pair of the cover portions along a direction from a side where the opening portion is located to an end portion side on other side, and other pair of the cover portions out of the two pairs of the cover portions is formed of connecting-cover portions configured to connect the two inclined-cover portions.

The two inclined-cover portions can be switched between an open state and a folded state by one of the inclined-cover portions relatively moving with respect to the other inclined-cover portion, basing the end portion sides on the opposite side of the side where the opening portion is located, and in the open state, the end portions on the opening portion side of both of the inclined-cover portions are separated, and in the folded state, both of the inclined-cover portions are oriented in parallel and adjacent to each other, and the two connecting-cover portions are connected to the inclined-cover portions in a transformable manner, and when the two inclined-cover portions are in the folded state, the connecting-cover portions enter gap between the inclined-cover portions by being transformed with respect to the inclined-cover portions.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is an external view of an image reading apparatus according to a first embodiment;

DETAILED DESCRIPTION OF THE PREFERRED EMBODIMENTS

Embodiments of an image reading apparatus according to the present invention will be described below in detail based on the drawings. Note that the present invention is not limited to the embodiments thereto. Further, components disclosed in the following embodiments may include components replaceable and easily conceivable by a person skilled in the art or substantially equivalent thereto.

First Embodiment

Figure 2:
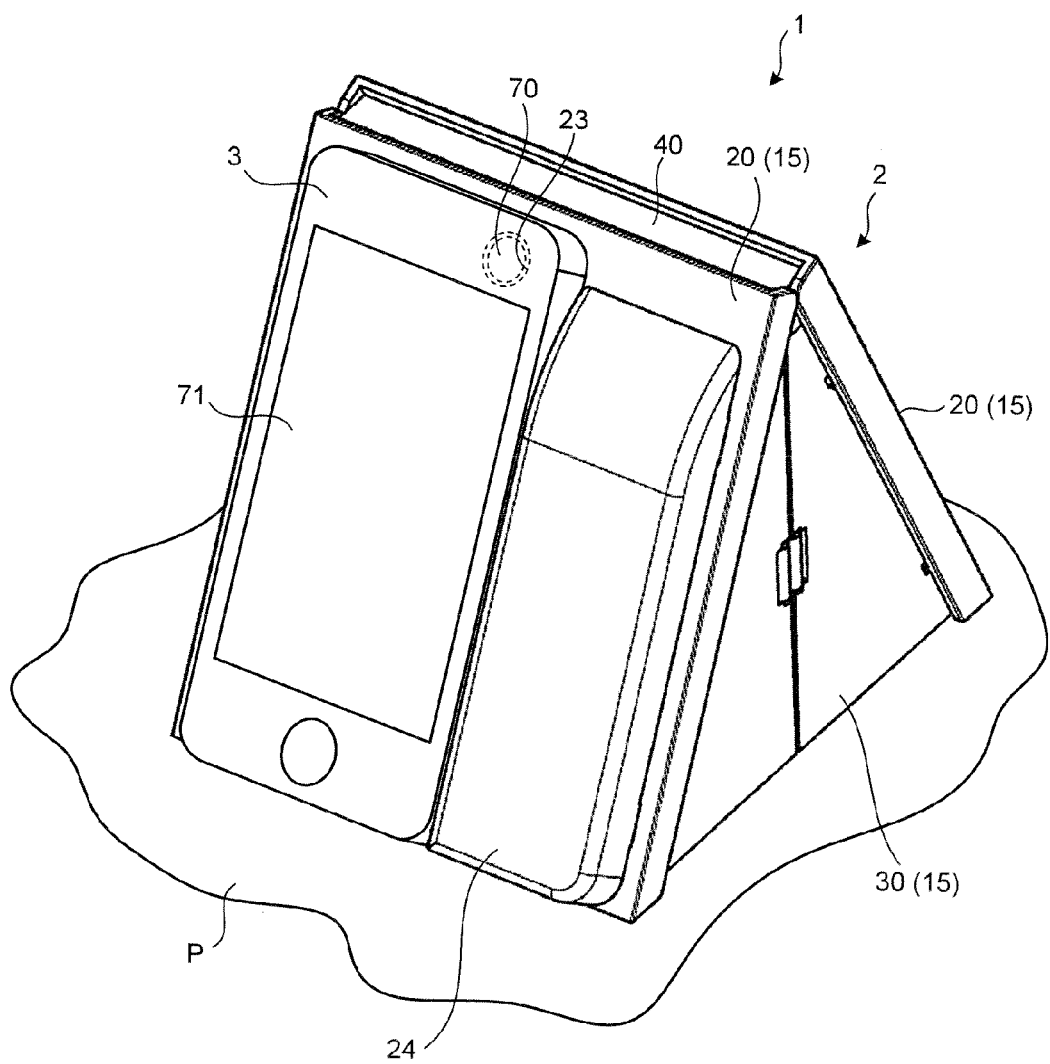
FIG. 2 is a diagram illustrating a state of using the image reading apparatus according to the first embodiment.

FIG. 1 is an external view of an image reading apparatus according to a first embodiment. FIG. 2 is a diagram illustrating a state of using the image reading apparatus according to the first embodiment. An image reading apparatus 1 according to the first embodiment is handheld size and generates image data corresponding to a medium P by capturing an image of the medium P by an image capturing unit 70 as illustrated in FIGS. 1 and 2. The image reading apparatus 1 according to the first embodiment generates the image data corresponding to a single sheet of photo (hereinafter, single photo) inside a photo album by reading the single photo inside the photo album as a reading target area Pt, defining the photo album in which silver halide photos and printed photos are gathered as the medium P.

A usage of the image reading apparatus 1 according to the first embodiment is not limited to the above case. The image reading apparatus 1 can be used not only in a case of generating image data corresponding to an image on a glossy paper (such as single silver halide photo, single printed photo, or magazine), but also in a case of generating image data corresponding to an image on a plain paper, therefore, the image reading apparatus 1 can be used for whichever medium from which a user wants to generate image data.

The image reading apparatus 1 is formed by including a housing 2 and an external device 3 as illustrated in FIG. 1. Among these components, the external device 3 includes an image capturing unit 70 configured to capture an object and a display unit 71 configured to display optional information. These image capturing unit 70 and display unit 71 are disposed on different surfaces of the external device 3 which are oriented in directions opposite to each other. More specifically, at the external device 3, the image capturing unit 70 is disposed on the surface on an opposite side of the surface where the display unit 71 is disposed. The external device 3 is used by having a reading application corresponding to a function as the image reading apparatus 1 preinstalled or having the reading application installed by reading from a recording medium (including downloading). The external device 3 according to the first embodiment is, for example, a mobile terminal such as a smartphone and a tablet provided with a telephone function, an Internet access function, etc., and also has a function as the image reading apparatus 1 as a part thereof.

The housing 2 can hold the external device 3 and is formed for the external device 3 that has a specific outer shape and a specific position of the image capturing unit 70 or the external device 3 that has an outer shape and the position of image capturing unit 70 within a predetermined range, for example, the external device 3 in the same series. When a reading target area Pt of the medium P is read by the image reading apparatus 1, reading is executed with the external device 3 being held by the housing 2.

Figure 3:
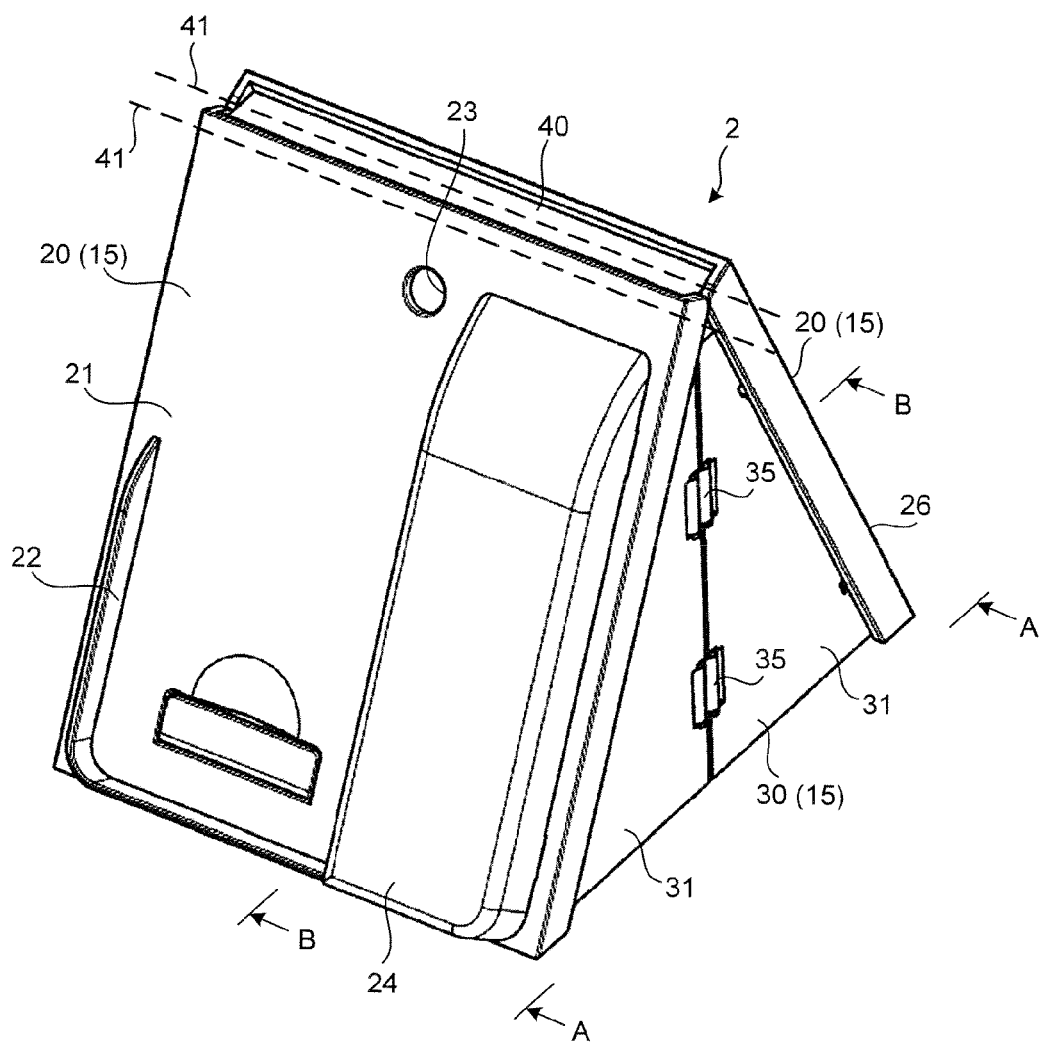
FIG. 3 is a perspective view illustrating a housing illustrated in FIG. 1.
Figure 4:
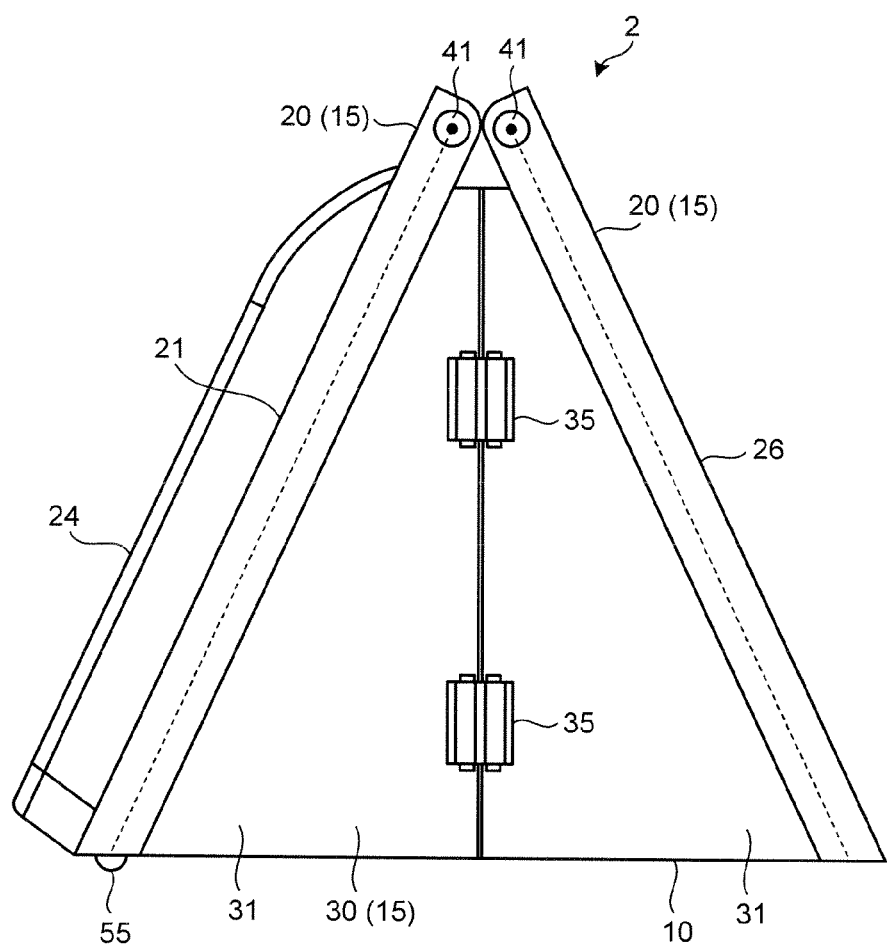
FIG. 4 is a diagram viewed from an arrow direction of line A-A in FIG. 3.
Figure 5:
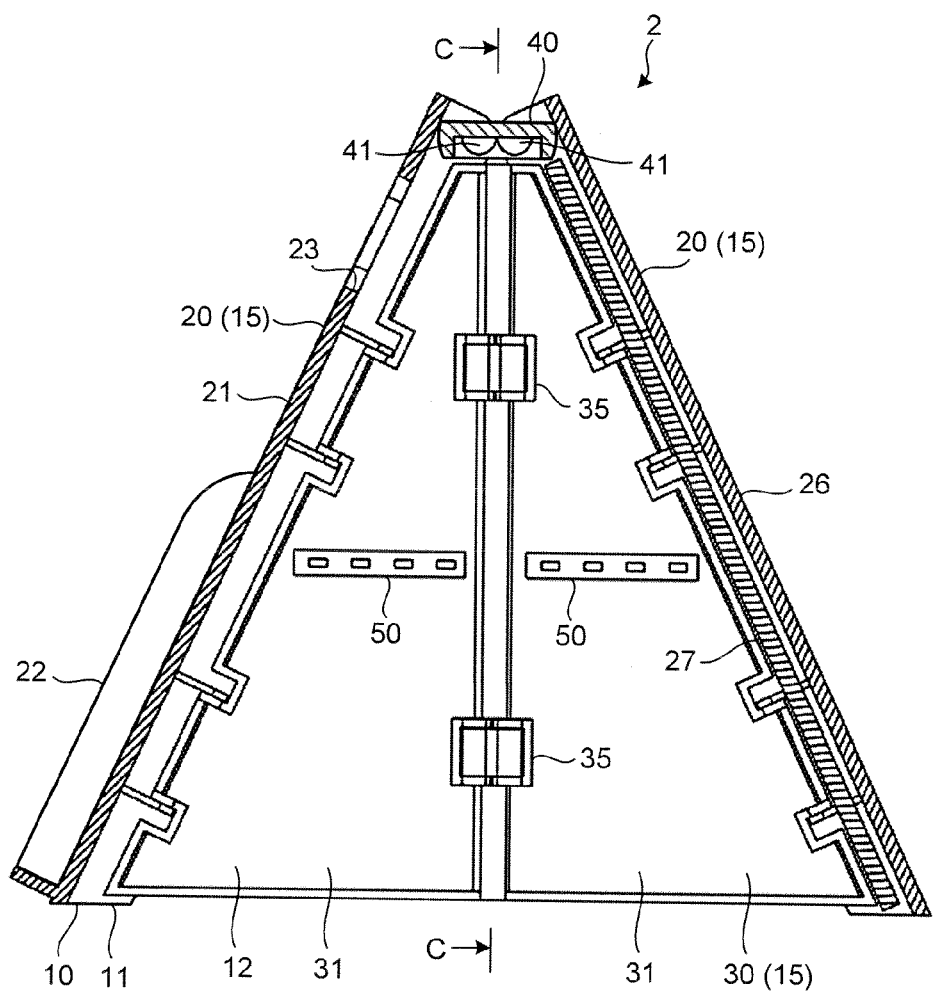
FIG. 5 is a cross-sectional view taken along line B-B in FIG. 3.

FIG. 3 is a perspective view illustrating a housing illustrated in FIG. 1. FIG. 4 is a diagram viewed from an arrow direction of line A-A in FIG. 3. FIG. 5 is a cross-sectional view taken along line B-B in FIG. 3. The housing 2 has a substantially triangular prism shape, and among three rectangular surfaces constituting the triangular prism, i.e. three side surfaces, one side surface has an opening, and this opening is opening portion 11 formed in a rectangular shape. The opening portion 11 has an area in which at least an L-size photograph (89 mm×127 mm) can be accommodated within the opening portion 11. Note that, considering image processing which will be explained later, preferably, the opening portion 11 has the area of about 102 mm×140 mm, for example, so as to make a margin between an outer edge of the opening portion 11 and an outer edge of a photograph in state that a center of the L-size photograph and a center of the opening portion 11 are matched.

At the time of using the image reading apparatus 1, the housing 2 is used such that the opening portion 11 is located at the lower side and opens downward. In other words, the housing 2 has the opening portion 11 on a bottom surface 10. Since the housing 2 includes the opening portion 11 on the bottom surface 10 as described above and the opening portion 11 is opened downward, with respect to the housing 2, ambient light irradiating the housing 2 from a surrounding area of the housing 2 can be blocked.

In the housing 2 thus configured, among the three side surfaces constituting the triangular prism which is the shape of the housing 2, remaining two side surfaces excluding the bottom surface 10, and two triangular bottom surfaces constituting the triangular prism are respectively formed as cover portions 15. These four cover portions 15 respectively correspond to four sides of the rectangular opening portion 11 and are provided as light shielding members to block the ambient light emitted from the surrounding area of the housing 2 to the housing 2 from irradiating the inside of the housing 2.

These four cover portions 15 constitute two pairs of cover portions where each pair include two cover portions 15 facing each other, and one pair of cover portions 15 out of the two pairs of cover portions 15 constitute inclined-cover portions 20. Each of the one pair of the cover portions 15 included in the inclined-cover portions 20 inclines in a direction approaching toward other one of the cover portions 15, along a direction from a side where the opening portion 11 is located toward an end portion side of each of the cover portions 15 on the opposite side to the opening portion 11. In other words, among the three side surfaces constituting the triangular prism which is the shape of the housing 2, two side surfaces excluding the bottom surface 10 constitute the inclined-cover portions 20.

One inclined-cover portion 20 out of the two side surfaces, i.e. two inclined-cover portions 20, is a first inclined-cover portion 21 which includes an external-device holding unit 22 configured to hold the external device 3, an image capturing opening 23 which is an opening for the external device 3 to capture the image of the medium P, and a power source housing unit 24 accommodating a power source 56 (see FIG. 9) such as a battery (not illustrated). Among these components, the image capturing opening 23 is formed of a hole that perforates through the first inclined-cover portion 21 and communicates between an outer surface side and an inner surface side of the housing 2 at the first inclined-cover portion 21.

Further, the external-device holding unit 22 is formed at the first inclined-cover portion 21 on the outer surface side of the housing 2, so that the external-device holding unit 22 is capable of holding the external device 3 at a position of the first inclined-cover portion 21 to be the outer surface side of the housing 2 such that the image capturing unit 70 of the external device 3 is located at a place where the image capturing opening 23 is formed. For example, the external-device holding unit 22 is formed to project from the first inclined-cover portion 21, to support a lower end portion of the external device 3 from a lower side and also support a side portion of the external device 3 sideways, in a state where the image capturing unit 70 of the external device 3 is located at the place where the image capturing opening 23 is formed. When the external device 3 is held by the external-device holding unit 22, the image capturing unit 70 is located at the place where the image capturing opening 23 is formed. Therefore, an image of the medium P exposed to the inside of the housing 2 can be captured by the image capturing unit 70 at the opening portion 11.

Further, the image reading apparatus 1 can perform communication between the housing 2 and the external device 3 or turn on the light source 50 (FIG. 5), and the power source housing unit 24 can accommodate the power source 56 such as the battery to supply power used for the operation.

Further, the first inclined-cover portion 21 includes a landing sensor 55 that is a blocking detection unit configured to detect blocking of the opening portion 11. The landing sensor 55 is disposed on the bottom surface 10 side of the first inclined-cover portion 21. The landing sensor 55 is a mechanical sensor that detects the blocking of the opening portion 11. When the bottom surface 10 of the housing 2 closely contacts the medium P and the opening portion 11 is blocked by the medium P, an arm of the landing sensor 55 is deformed by the medium P which makes the landing sensor 55 turn ON.

Further, in the two inclined-cover portions 20, the other inclined-cover portion 20, namely, a second inclined-cover portion 26 is provided with a mirror 27 on a surface corresponding to the inner surface side of the housing 2. In other words, the mirror 27 is disposed on the surface of the second inclined-cover portion 26 facing the first inclined-cover portion 21. Thus, the mirror 27 disposed on the inner surface side of the second inclined-cover portion 26 is provided so as to reflect the medium P exposed to a housing inner portion 12 at the opening portion 11, thereby enabling the image capturing unit 70 to capture a reflected mirror image.

Further, a positional relation among the mirror 27, the image capturing unit 70 of the external device 3 in a state of being held by the external-device holding unit 22, and the opening portion 11 is set such that an image capturing area S of the image capturing unit 70 (see FIG. 10) via the mirror 27 becomes an area equal to or larger than the area of the opening portion 11. By this, the external device 3 is held by the external-device holding unit 22, and the image capturing unit 70 can capture an entire region of the medium P exposed to the housing inner portion 12 at the opening portion 11 in the state that the image capturing unit 70 is located at the position of the image capturing opening 23.

Further, among the four cover portions 15, the other pair of the cover portions 15 mutually facing, out of the two pairs of cover portions 15, is formed as connecting-cover portions 30 connecting the two inclined-cover portions 20. The connecting-cover portions 30 are formed of two bottom surfaces constituting the triangular prism which is the shape of the housing 2. Further, when viewed from a front side of one of the connecting-cover portions 30, the housing 2 has a substantially isosceles triangular shape having a base that is aside of the connecting-cover portion 30 on the opening portion 11 side. Therefore, an angle x° formed between one inclined-cover portion 20 out of the two inclined-cover portions 20 and the side of the connecting-cover portion 30 on the opening portion 11 side is substantially same as the angle x° formed between the other inclined-cover portion 20 and the side of the connecting-cover portion 30 on the opening portion 11 side.

Among the cover portions 15, the inclined-cover portions 20 can switch a positional relation between the inclined-cover portions 20 by one of the inclined-cover portions 20 relatively moving with respect to the other inclined-cover portion 20, making the end portion sides on the opposite side of the side where the opening portion 11 is located as a reference side. Specifically, the two inclined-cover portions 20 can be switched between an open state and a folded state by one of the inclined-cover portions 20 relatively moving with respect to the other inclined-cover portion 20. In the open state, the end portions of both of the inclined-cover portions 20 on the opening portion 11 side are separated (see FIG. 3), and in the folded state, both of the inclined-cover portions 20 are oriented parallel and adjacent to each other (see FIGS. 15 and 16).

More specifically, each of the two inclined-cover portions 20 includes a rotary axis 41 extending in a direction bridging between the two connecting-cover portions 30 at the end portion side opposite to the side where the opening portion 11 is located, and the inclined-cover portions 20 can be rotated around the rotary axes 41 respectively. The two inclined-cover portions 20 thus rotate around the different rotary axes 41 respectively, thereby each of the inclined-cover portions 20 relatively moves with respect to the other inclined-cover portion 20. By thus moving, the two inclined-cover portions 20 can be switched between the open state and the folded state.

Further, with respect to the connecting-cover portions 30, each one of the connecting-cover portions 30 is composed of a plurality of swing members 31 mutually connected in a swingable manner. More specifically, each of the two connecting-cover portions 30 is divided into two sections by a line which is orthogonal to the base side of the isosceles triangle and extends from a vertex of the isosceles triangle to the base side of the isosceles triangle which is the shape of the connecting-cover portion 30. The divided sections are the swing members 31 respectively. Between the two swing members 31 included in each of the connecting-cover portions 30, connecting members 35 swingable with respect to the respective swing members 31 are disposed. The two swing members 31 are mutually connected by the connecting members 35 in a manner swingable with respect to the other swing member 31.

Further, the two swing members 31 included in the respective connecting-cover portion 30 are respectively connected to the different inclined-cover portions 20 in a swingable manner. In other words, the respective connecting-cover portions 30 connect the two inclined-cover portions 20 by the two swing members 31 being connected by the connecting members 35 in a swingable manner and also by the respective swing members 31 being connected to the different inclined-cover portions 20 in a swingable manner.

In each of the two connecting-cover portions 30, the swing members 31 are connected each other in a swingable manner, and are also connected to the inclined-cover portions 20 in a swingable manner. Therefore, the two connecting-cover portions 30 are connected to the inclined-cover portions 20 in a transformable manner. With this configuration, when the two inclined-cover portions 20 are in the folded state, the connecting-cover portions 30 can enter a gap between the two inclined-cover portions 20 by being transformed with respect to the two inclined-cover portions 20.

In other words, when the two inclined-cover portions 20 are in the folded state, the swing members 31 are relatively swung each other, so that the swing members 31 are connected to the inclined-cover portions 20 in a transformable manner with respect to the inclined-cover portions 20. Consequently, when the two inclined-cover portions 20 are in the folded state, the connecting-cover portions 30 can enter the gap between the inclined-cover portions 20 because the swing members 31 are relatively swung each other and the connecting-cover portions 30 are oriented parallel to the two inclined-cover portions 20.

Additionally, a plurality of light sources 50 is disposed at the housing inner portion 12. The plurality of light sources 50 is arranged so as to be able to irradiate different areas on a horizontal surface of the opening portion 11 with the light emitted toward the opening portion 11. The light sources 50 thus arranged in the housing inner portion 12 are disposed at the connecting-cover portions 30 on the inner surface side of housing 2, and specifically, arranged at the two swing members 31 included in each of the connecting-cover portions 30, respectively. In other words, the light sources 50 are disposed at four places in the housing inner portion 12.

Figure 6:
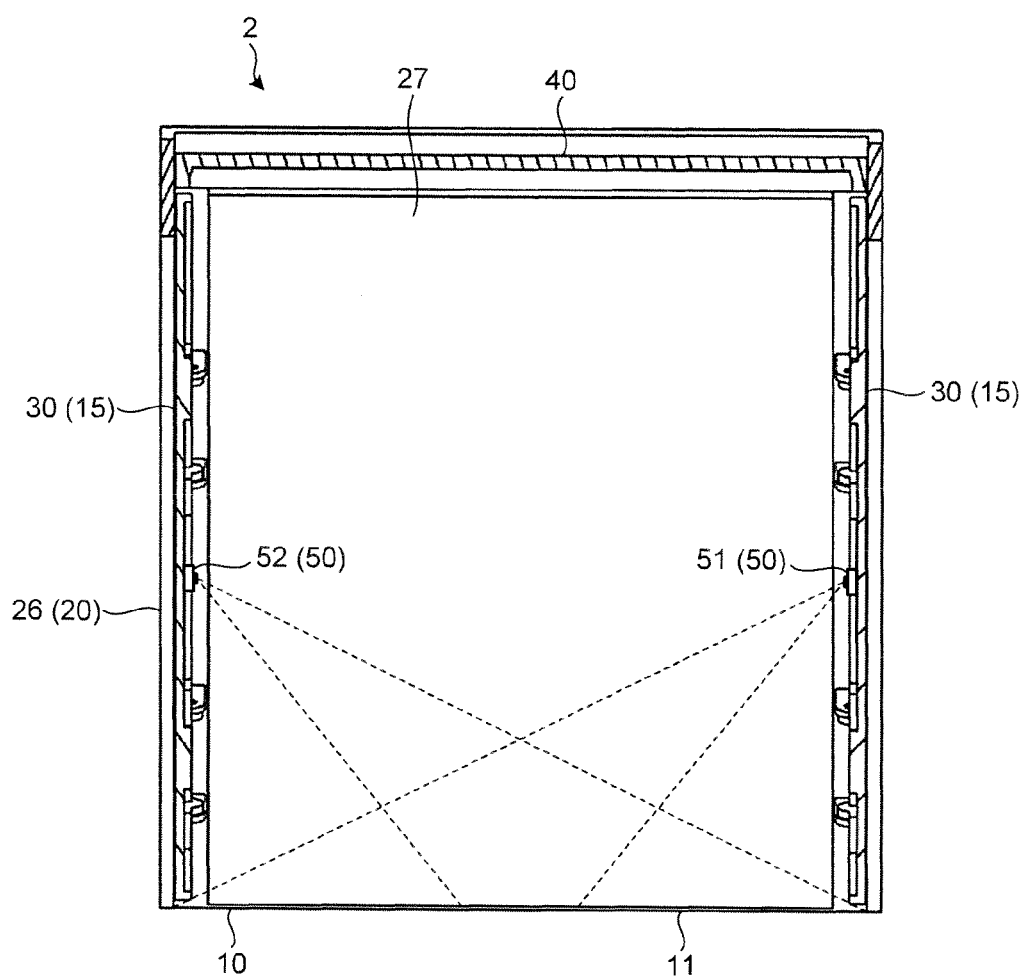
FIG. 6 is a cross-sectional view taken along line C-C in FIG. 5.

FIG. 6 is a cross-sectional view taken along line C-C in FIG. 5. More specifically, the light sources 50 include a first light source 51 disposed at one connecting-cover portions 30 out of the two connecting-cover portions 30, and a second light source 52 disposed at the other connecting-cover portion 30. The first light source 51 is disposed at each of the two swing members 31 included in the connecting-cover portion 30 on the side where the first light source 51 is disposed, and the second light source 52 is disposed at each of the two swing members 31 included in the connecting-cover portion 30 on the side where the second light source 52 is disposed. The light sources 50 thus disposed at the respective swing members 31 form a light-emitting module in which a plurality of light emitting devices, such as LED (Light Emitting Diode) and LD (Laser Diode), is arrayed in a strip, and turned on by power supplied from the power source 56 (see FIG. 9), thereby achieving to emit the light.

The first light source 51 and the second light source 52 have the light amount sufficient for capturing an image of an entire area (area including the reading target area Pt) of the medium P exposed to the housing inner portion 12 from the opening portion 11. The first light source 51 and the second light source 52 are composed so that the first light source 51 and the second light source 52 can emit the light to the different areas on the horizontal surface of the opening portion 11. More specifically, the first light source 51 can emit the light to a position on the opening portion 11 close to the connecting-cover portion 30 where the second light source 52 is disposed, and the second light source 52 can emit the light to a position on the opening portion 11 close to the connecting-cover portion 30 where the first light source 51 is disposed. In other words, the first light source 51 and the second light source 52 have different main light irradiation areas.

Note that the main light irradiation area referred here is defined as an area to be irradiated with the light which is the light emitted from the first light source 51 and the second light source 52 and specularly reflected at the medium P and further reflected at the mirror 27 to be incident to the image capturing unit 70. This area is an area in generated image data, where the light emitted from the first light source 51 and the second light source 52 is specularly reflected at the medium P and an image in the area of the medium P corresponding to the area where the light is specularly reflected cannot be identified.

Figure 7:
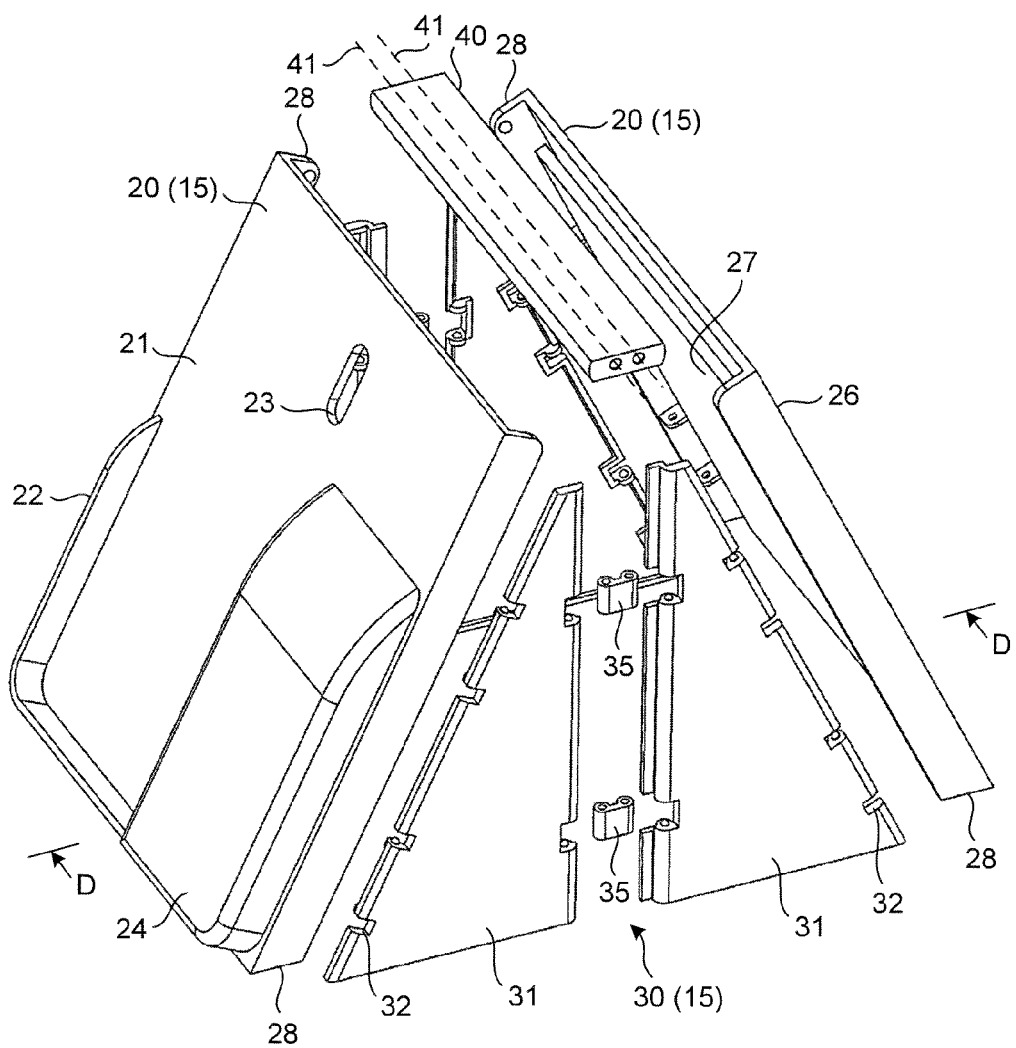
FIG. 7 is an exploded perspective view of the housing illustrated in FIG. 3.
Figure 8:
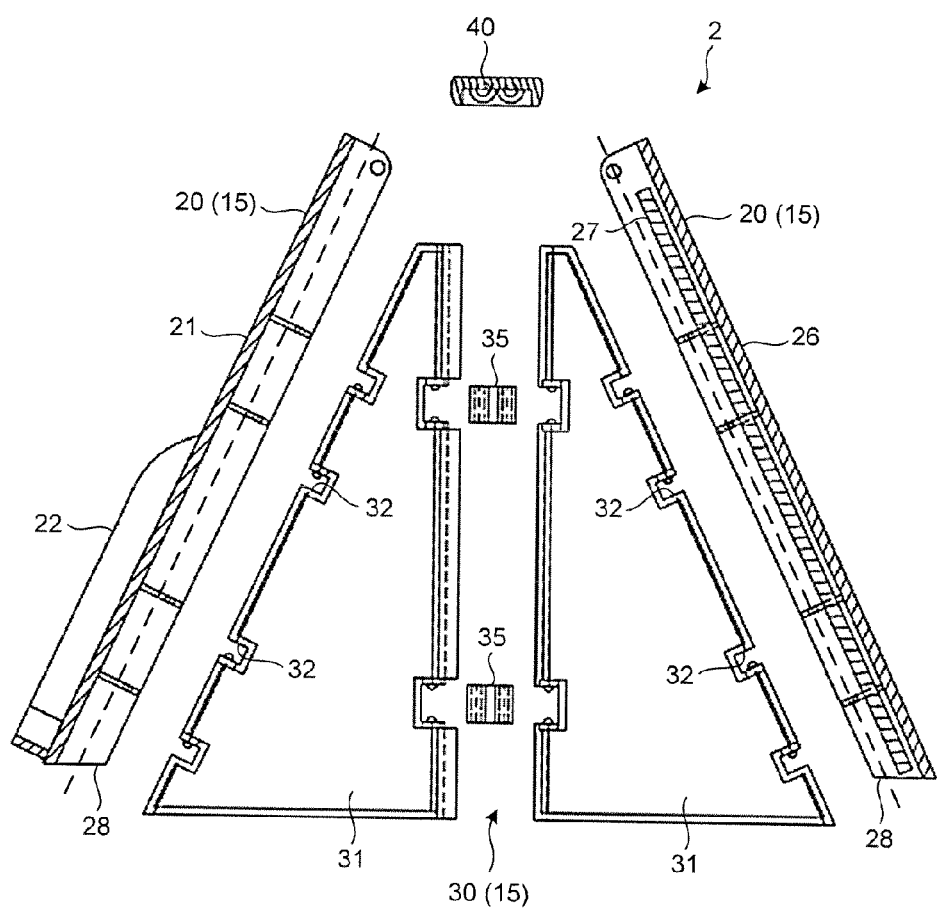
FIG. 8 is a cross-sectional view taken along line D-D in FIG. 7.

FIG. 7 is an exploded perspective view of the housing illustrated in FIG. 3. FIG. 8 is a cross-sectional view taken along line D-D in FIG. 7. The housing 2 includes a rotatable-cover portion 40 besides the inclined-cover portions 20 and the connecting-cover portions 30, and the rotatable-cover portion 40 is disposed on the end portion sides on the opposite side of the sides where the opening portion 11 of the inclined-cover portion 20 is located. At this position, the rotatable-cover portion 40 extends from the side where one of the connecting-cover portions 30 is located to the side where the other connecting-cover portion 30 is located. Each of the two inclined-cover portions 20 has the end portion side on the opposite side of the side where the opening portion 11 is located connected to the rotatable-cover portion 40 in a rotatable manner. The rotary axis 41 of the inclined-cover portion 20 is composed such that the inclined-cover portion 20 is connected to the rotatable-cover portion 40 in a rotatable manner. In other words, the rotary axis 41 is a virtual center axis when the inclined-cover portions 20 are rotated.

With respect to a connecting portion between the inclined-cover portions 20 and the rotatable-cover portion 40, each of the two inclined-cover portions 20 includes bent portions 28 which are formed by bending both end sides, in the extending direction of the rotatable-cover portion 40, toward the side where the other inclined-cover portion 20 is located. The inclined-cover portions 20 cover the rotatable-cover portion 40 from the both sides of the extending direction by sandwiching the rotatable-cover portion 40 between the bent portions 28.

A projection is formed at the bent portion 28 in a manner projecting in the extending direction of the rotatable-cover portion 40, and a hole is formed at the end portion of the rotatable-cover portion 40 such that the projection formed on the bent portion 28 is fitted into the hole. The projection formed at the bent portion 28 is fitted in the hole formed at the rotatable-cover portion 40, thereby a center axis of the projection and the hole functions as the rotary axis 41. As a result, the inclined-cover portions 20 and the rotatable-cover portion 40 are connected in a manner in which the inclined-cover portions 20 are rotatable with respect to the rotatable-cover portion 40. Note that positions of the projection and hole may be reversed between the bent portion 28 of the inclined-cover portion 20 and the rotatable-cover portion 40. Connecting structure may be any structure as long as the inclined-cover portion 20 is connected to the rotatable-cover portion 40 in a manner rotatable around the rotary axis 41.

Further, each of the connecting-cover portions 30 includes two connecting members 35, and the two swing members 31 included in one connecting-cover portion 30 are connected by the two connecting members 35 in a swingable manner at two points. Further, a plurality of swingable connecting portions 32 is formed at the swing member 31 at a portion connected to the inclined-cover portion 20. The swingable connecting portions 32 include projections projecting along a side of the swing member 31 to be connected to the inclined-cover portion 20, and the inclined-cover portion 20 includes, at the bent portion 28, a member formed with holes to which the projections are inserted. The swing member 31 is connected to the inclined-cover portion 20 in a swingable manner by the projections formed at the swingable connecting portions 32 being inserted into the holes formed on the member provided at the bent portion 28. Note that the positions of the projections and holes may be reversed between the swingable connecting portions 32 and the bent portion 28 of the inclined-cover portion 20. The connecting structure may be any structure as long as the swing member 31 is connected to the inclined-cover portion 20 in a swingable manner.

Figure 9:
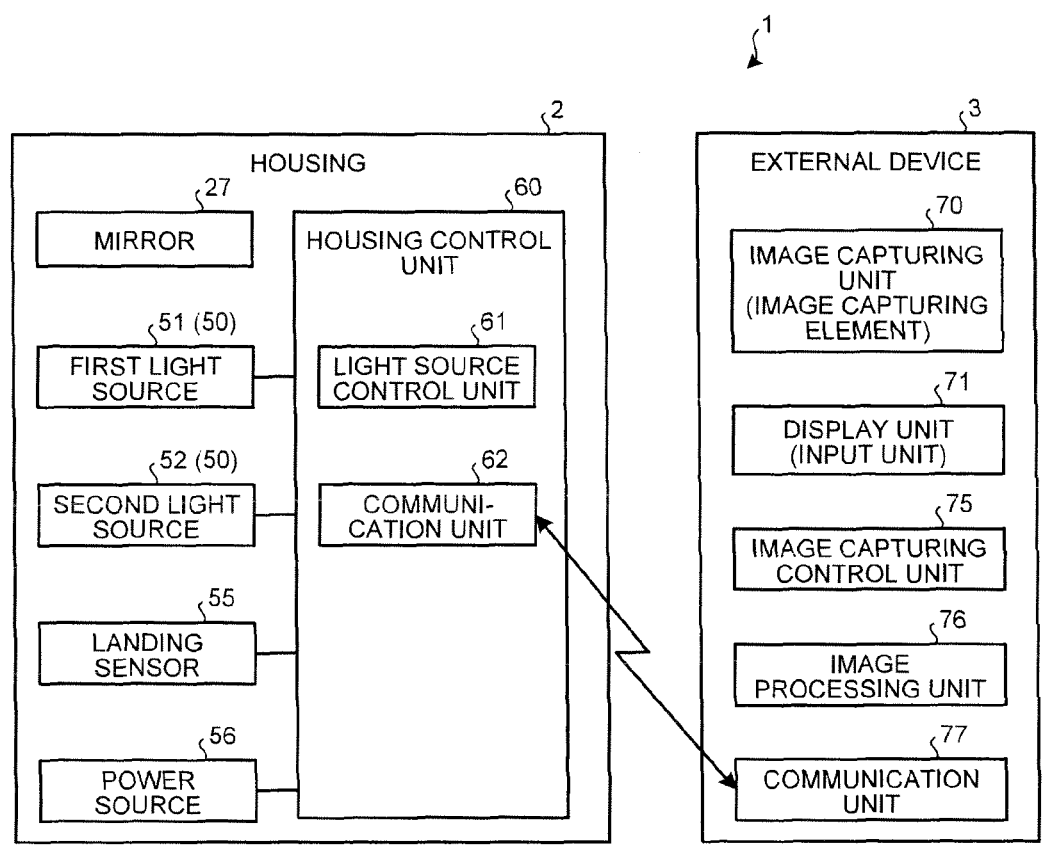
FIG. 9 is a functional block diagram of the image reading apparatus illustrated in FIG. 1.

FIG. 9 is a functional block diagram of the image reading apparatus illustrated in FIG. 1. The housing 2 constituting the image reading apparatus 1 together with the external device 3 includes the mirror 27, the first light source 51, the second light source 52, the landing sensor 55, the power source 56, and a housing control unit 60. Thus, a hardware configuration of the housing control unit 60 included in the housing 2 is mainly formed of a CPU (Central Processing Unit) to perform arithmetic processing, a memory (RAM, ROM) to store programs and information, an input/output interface, etc., same as a known control device. Accordingly, a detailed description will be omitted here.

Further, the first light source 51 and the second light source 52, namely, the light sources 50 and the landing sensor 55 are electrically connected to the housing control unit 60. Therefore, the light sources 50 can be turned on or turned off by the housing control unit 60, and a detection result detected by the landing sensor 55 can be received at the housing control unit 60. More specifically, the housing control unit 60 has a function as a light source control unit 61 to control lighting states of the light sources 50. A light amount and timings of turning on or off of the light sources 50 can be controlled by this housing control unit 60. At this point, the light source control unit 61 can also control the lighting states of the light sources 50 by referring to the detection result of the landing sensor 55.

Additionally, the power source 56 accommodated inside the power source housing unit 24 is also electrically connected to the housing control unit 60, and respective units included in the housing 2 and configured to operate by power can be operated by power supplied from the power source 56. A battery such as a primary battery or a secondary battery, for example, is used as the power source 56 configured to supply power to operate the respective units of the housing 2.

Further, the housing control unit 60 includes a communication unit 62 capable of communicating with the external device 3. The communication unit 62 performs wireless communication by, for example, Bluetooth (registered trademark). The communication with the external device 3 may be performed by a method other than Bluetooth, such as NFC (Near Field Communication) or infrared communication, as long as wireless communication can be performed between the housing 2 and the external device 3 held at the external-device holding unit 22.

On the other hand, the external device 3 includes the image capturing unit 70, the display unit 71, an image capturing control unit 75, an image processing unit 76, and a communication unit 77, and also includes a power source unit (not illustrated) and a storage unit (not illustrated) besides the above units. Among these units, the image capturing unit 70 is disposed on a rear surface of the external device 3 (surface on the opposite side of the surface where the display unit 71 is disposed) and is formed of arrays of image capturing elements arranged in a plane such as CCD image sensors and CMOS image sensors driven by power from the power source unit of the external device 3. The image capturing unit 70 is configured to capture an image of an object within an image capturing range at one time by the arrays of image capturing elements arranged in a plane.

Further, the display unit 71 can display an optional image and also can display the image captured by the image capturing unit 70. The display unit 71 is disposed on a front surface of the external device 3 and formed of a display such as a liquid crystal display or an organic EL display driven by power from the power source unit of the external device 3. Further, the display unit 71 is a touch panel display having a function as an input unit besides a function as an output unit of the external device 3. Therefore, when a user touches an arbitrary position on the display unit 71, the display unit 71 can output an electric signal corresponding to the position touched by the user. Thus, the user can perform optional input operation to the external device 3.

Additionally, the image capturing control unit 75, image processing unit 76, and communication unit 77 are provided as functions of the control unit included in the external device 3. The hardware configuration of the control unit having the functions such as the image capturing control unit 75 is mainly composed of a CPU configured to perform arithmetic processing, a memory (RAM, ROM) to store programs and information, an input/output interface, etc., same as a known smartphone. Accordingly, a detailed description will be omitted here.

Among these components, the image capturing control unit 75 can control the image capturing unit 70 and executes control related to image capturing by the image capturing unit 70, such as adjustment for timing of image capturing and an exposing time, and focusing. Further, the image processing unit 76 can apply the image processing to the image captured by the image capturing unit 70. More specifically, in the case where the image capturing unit 70 captures the image, the respective image capturing elements included in the image capturing unit 70 output image signals to the image processing unit 76 at every exposure based on output values corresponding to incident light, and the image processing unit 76 executes the image processing such as generation of a piece of image data based on the image signal.

Further, the communication unit 77 can communicate with the communication unit 62 of the housing 2 by Bluetooth or the like. The housing 2 can communicate with the external device 3 by wireless communication, using respective communication units 62 and 77.

Figure 10:
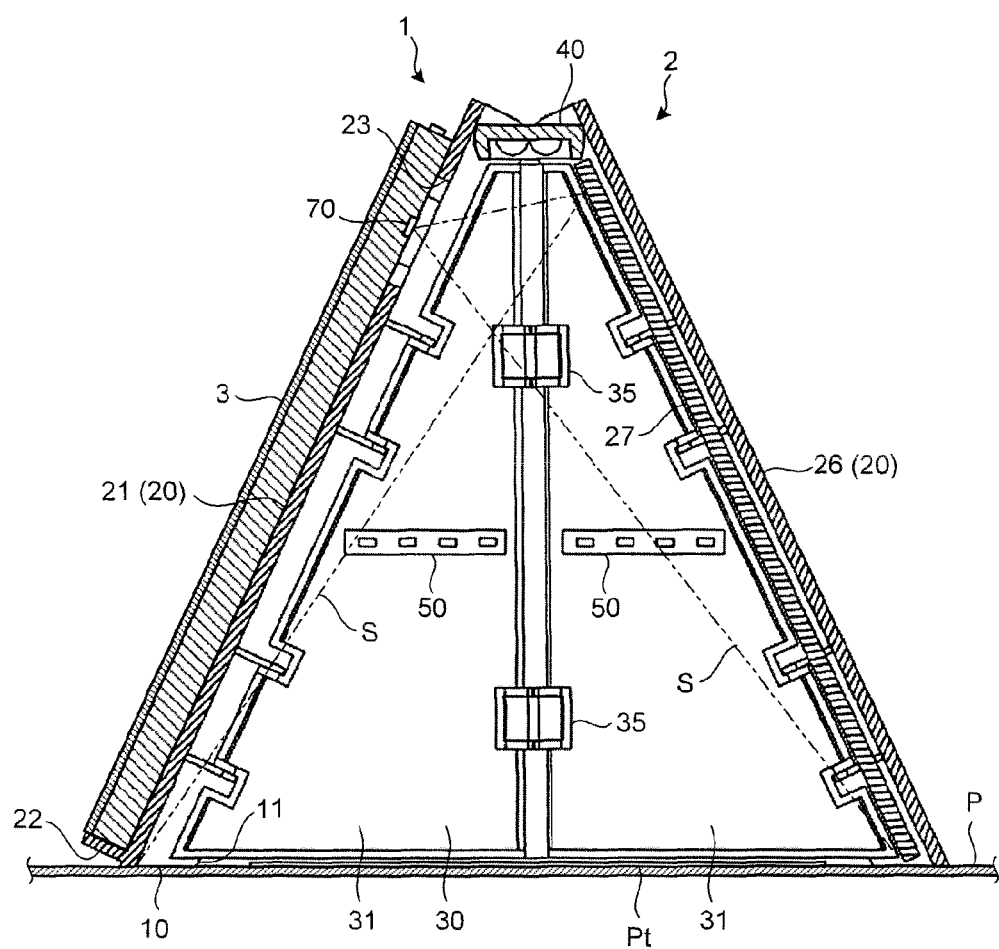
FIG. 10 is an explanatory diagram for the case of reading an image by the image reading apparatus illustrated in FIG. 1.

The image reading apparatus 1 according to the first embodiment has the configuration described above, and operation thereof will be described below. FIG. 10 is an explanatory diagram in the case of reading an image by the image reading apparatus illustrated in FIG. 1. In the case of reading the medium P by the image reading apparatus 1, the housing 2 is set in the open state, and the housing 2 in the open state is placed on the medium P such that the reading target area Pt of the medium P is located within the opening portion 11. When the housing 2 is placed on the medium P, the landing sensor 55 disposed on the bottom surface 10 is deformed by being contacted with the medium P and detects that the opening portion 11 is blocked. When the landing sensor 55 detects the blocked state of the opening portion 11, the light source control unit 61 turns on both of the first light source 51 and second light source 52. Meanwhile, in the case where the state in which both of the first light source 51 and second light source 52 are turned on continues for a predetermined time, the light source control unit 61 may control the light sources 50 to turn off both of the first light source 51 and second light source 52.

After the housing 2 is placed on the medium P, the external device 3 is held at the external-device holding unit 22 such that the image capturing unit 70 faces the image capturing opening 23. By this, the image capturing unit 70 can capture an image inside the housing 2 via the image capturing opening 23, and the image of the medium P reflected at the mirror 27 inside the housing 2 can be read.

Thus, when the external device 3 is held at the external-device holding unit 22, the external device 3 is set in a state capable of reading the medium P using the reading application which corresponds to the function as the image reading apparatus 1, and held at the external-device holding unit 22 with the reading application started up. In the case of executing the reading application, an image currently captured by the image capturing unit 70 is displayed on the display unit 71 of the external device 3 based on an image data signal output from the image processing unit 76. Therefore, in the case of executing the reading application while the external device 3 is held at the external-device holding unit 22, the image of the medium P reflected at the mirror 27 and currently captured by the image capturing unit 70 is displayed on the display unit 71.

Also, in the case where the reading application is executed, a shutter release button is displayed as an icon on the display unit 71 of the external device 3. According to the reading application, when a user presses the shutter release button by touching the ion, an image capturing command ordering image capturing by the image capturing unit 70 is output from the image capturing control unit 75 to the image capturing unit 70, and the image is read based on the image captured by the image capturing unit 70. In other words, desired image processing is performed on the image data captured by the image capturing unit 70, and the image data is stored in the storage unit by storing the image data in the storage unit included in the external device 3.

At the time of reading the image by executing the reading application, the light source control unit 61 controls the light sources 50 so that a state where only the first light source 51 is turned on is executed and then a state where only the second light source 52 is turned on is executed. More specifically, the housing 2 and the external device 3 can communicate by performing wireless communication between the communication unit 62 of the housing 2 and the communication unit 77 of the external device 3. In the case of reading the medium P by capturing the image with the image capturing unit 70 of the external device 3, cooperative control is executed by sending and receiving signals between the housing 2 and the external device 3. At the time of reading the image, not only control for the image capturing unit 70 but also control for the light sources 50 are executed by the cooperative control, and a state in which the second light source 52 is turned off and only the first light source 51 is turned on is executed and then a state in which the first light source 51 is turned off and only the second light source 52 is turned on is executed.

In this case, the image capturing control unit 75 causes the image capturing unit 70 to capture the medium P once in each time when only the first light source 51 is turned on and when only the second light source 52 is turned on. In other words, every time the image capturing unit 70 captures an image, alight source 50 different from a light source 50 previously turned on is turned on out of the plurality of light sources 50, and the image capturing unit 70 captures the image every time the light source 50 is turned on.

Figure 11:
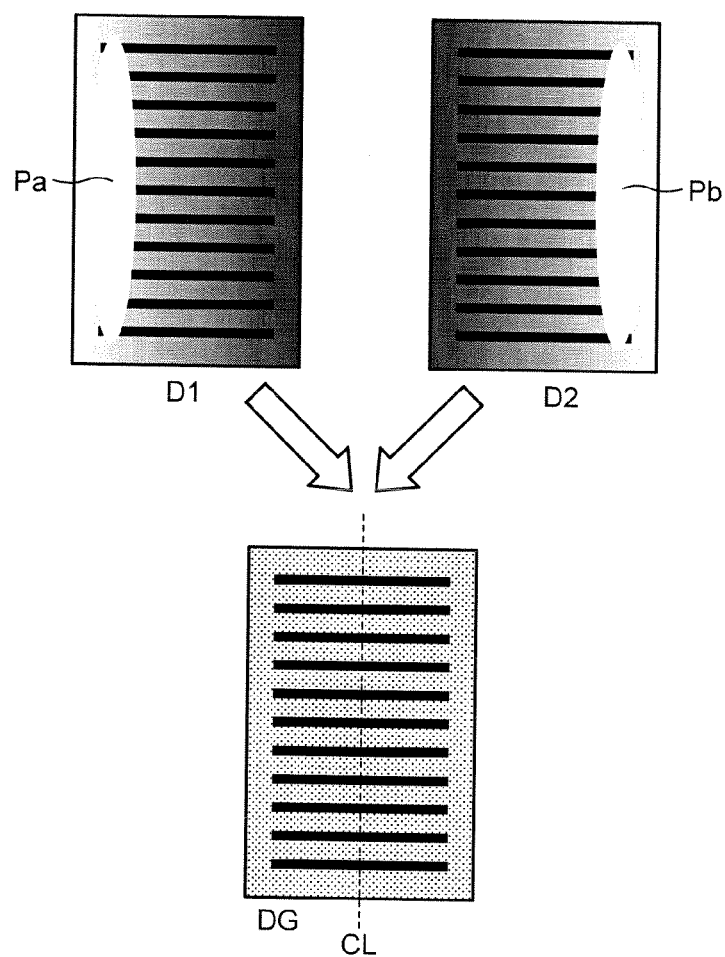
FIG. 11 is an explanatory diagram for the case where image data captured by an image capturing unit is combined.

FIG. 11 is an explanatory diagram for the case where image data captured by the image capturing unit is combined. In the case where the image capturing unit 70 captures the image, the image processing unit 76 generates image data (combined image data DG) by combining the image data (first image data D1) which is generated by capturing the image with the image capturing unit 70 when only the first light source 51 is turned on, with the image data (second image data D2) which is generated by capturing the image with the image capturing unit 70 when only the second light source 52 is turned on. Since the first image data D1 is captured when only the first light source 51 is turned on, in the case where the light emitted from the first light source 51 is specularly reflected at the medium P, a reflection Pa of the first light source 51 is generated in an area corresponding to the main light irradiation area of the first light source 51. As a result, the image in the area corresponding to the medium P cannot be identified. On the other hand, since the second image data D2 is captured when only the second light source 52 is turned on, in the case where the light emitted from the second light source 52 is specularly reflected at the medium P, a reflection Pb of the second light source 52 is generated in an area corresponding to the main light irradiation area of the second light source 52. As a result, the image in the area corresponding to the medium P cannot be identified.

Here, the reflections Pa, Pb are generated at different positions of the image data. This is because the first light source 51 and second light source 52 irradiate different areas on the horizontal surface of the opening portion 11 with the light. Therefore, in the first image data D1, the image in the area of the medium P corresponding to the reflection Pb can be identified. On the other hand, in the second image data D2, the image in the area of the medium P corresponding to the reflection Pa can be identified.

The image processing unit 76 generates the combined image data DG by extracting, from the both of the image data D1, D2, the area where the image in the area of the medium P can be identified. Therefore, the image processing unit 76 according to the first embodiment sets a central line CL of both of the image data D1, D2, which is positioned between the reflections Pa and Pb in both of the image data D1, D2, as a boundary. Further, the image processing unit 76 generates the combined image data DG by extracting an area on the opposite side of the side where the reflection Pa is generated relative to the central line CL of the first image data D1, and also extracting an area on the opposite side of the side where the reflection Pb is generated relative to the central line CL of the second image data D2, and then combining the image data corresponding to the extracted two areas. By this, the generated combined image data DG is formed of the areas having high image quality out of both of the image data D1, D2.

The image processing unit 76 further performs, on the generated combined image data DG, various kinds of corrections such as boundary smoothing, mirror inversion correction, perspective transform, rectangle cropping, and gamma correction. After corrections are performed on the combined image data DG by the image processing unit 76, the corrected combined image data DG is stored in the storage unit of the external device 3, thereby reading the image of the medium P.

Figure 12:
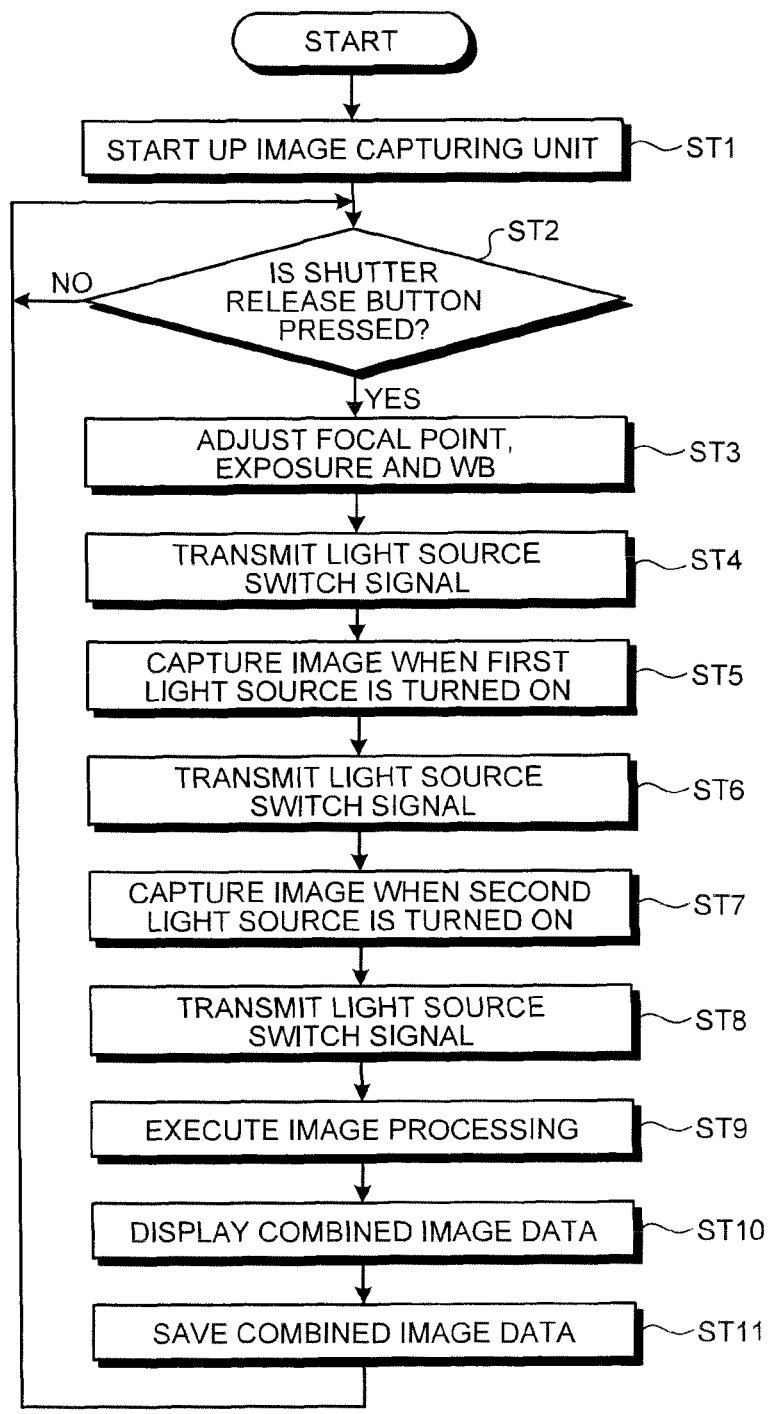
FIG. 12 is a flowchart illustrating an operating procedure in an external device at the time of executing reading operation by the image reading apparatus according to the first embodiment.

Next, reading operation for the medium P by the image reading apparatus 1 according to the first embodiment will be explained. FIG. 12 is a flowchart illustrating an operating procedure in the external device at the time of executing reading operation by the image reading apparatus according to the first embodiment. The reading operation for the medium P by the image reading apparatus 1 is executed while the external device 3 is set at the housing 2. First, the external device 3 starts up the image capturing unit 70 based on a user's execution command for the reading application of the external device 3 (Step ST1). Here, the execution command for the reading application is given by, for example, the user operation of the display unit 71 so as to display an icon of a start button corresponding to the reading application on the display unit 71, and of pressing the start button. The image capturing unit 70 is started by this operation, and continues image capturing at the opening portion 11. The image signals are sequentially output to the image processing unit 76 and the image processing unit 76 sequentially generates the image data. Then, images based on the generated image data is sequentially displayed on the display unit 71.

Next, whether the shutter release button is pressed is determined (Step ST2). More specifically, when the reading application is executed, the shutter release button is displayed as the icon on the display unit 71 together with the image. Therefore, the external device 3 determines whether the shutter release button displayed on the display unit 71 is pressed. In the case where it is determined that the shutter release button is not pressed by this determination (Step ST2: No), determination is repeated until the shutter release button is pressed, and the external device 3 waits until the shutter release button is pressed.

Figure 13:
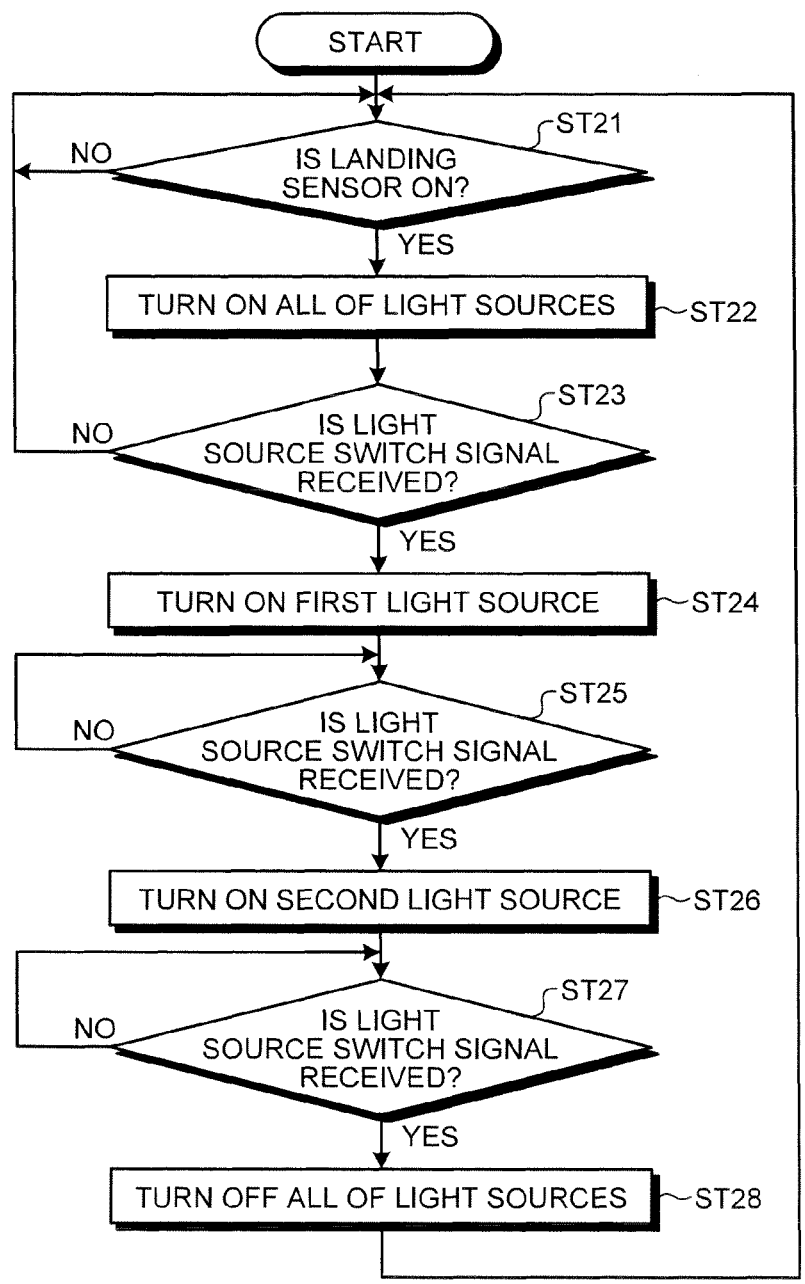
FIG. 13 is a flowchart illustrating an operating procedure in the housing at the time of executing the reading operation by the image reading apparatus according to the first embodiment.

FIG. 13 is a flowchart illustrating an operating procedure in the housing at the time of executing the reading operation by the image reading apparatus according to the first embodiment. Further, at the time of reading the medium P by the image reading apparatus 1, whether the landing sensor 55 is turned ON is first determined at the housing 2 (Step ST21). More specifically, at the time of reading the medium P, the user confirms the medium P to be read, and manually positions the image reading apparatus 1 with respect to the medium P such that the opening portion 11 faces the reading target area Pt of the medium P. Note that the plurality of the light sources 50 is turned off at this point. In a state where the bottom surface 10 of the housing 2 contacts the medium P and reading of the medium P is possible, the landing sensor 55 is turned ON. Therefore, the housing control unit 60 determines whether the opening portion 11 is blocked and the housing 2 is in a state reading of the medium P is possible by determining whether the landing sensor 55 is turned ON. In the case where it is determined that the landing sensor 55 is not turned ON (Step ST21: No), determination is repeated until it is determined that the landing sensor 55 is turned ON, waiting until the landing sensor 55 is turned ON.

When it is determined that the landing sensor 55 is turned ON (Step ST21: Yes) and it can be determined that the bottom surface 10 of the housing 2 is in the state closely contacting the medium P or a surface where the medium P is placed, all of the light sources 50 are turned on (Step ST22). In other words, before the bottom surface 10 of the housing 2 is made to contact the medium P or the surface where medium P is placed, the plurality of the light sources 50 is turned off, and the housing inner portion 12 is completely dark. On the other hand, in the external device 3, the images of the medium P which blocks the opening portion 11 are sequentially captured by the image capturing unit 70. However, since the housing inner portion 12 is completely dark, the sequentially generated image data is short of a light amount and the image in the reading target area Pt of the corresponding medium P cannot be recognized. Therefore, when it is determined that the landing sensor 55 is turned ON and it can be determined that the opening portion 11 is in the state of being blocked by the medium P or the surface where the medium P is placed, the light source control unit 61 turns on all of the plurality of light sources 50. Therefore, the housing inner portion 12 is irradiated with the light from the plurality of light sources 50, and the light from the plurality of light sources 50 is emitted directly or via the mirror 27 to the medium P which blocks the opening portion 11.

While the images of the medium P are sequentially displayed on the display unit 71 based on the image data sequentially captured by the image capturing unit 70, the user can recognize the image at the reading target area Pt by the medium P being irradiated with the light from the plurality of light sources 50. Consequently, the user can adjust a positional relation between the medium P and the opening portion 11 based on the images displayed on the display unit 71, and the reading target area Pt can be placed within the opening portion 11. Note that the reflections Pa, Pb may be generated in the image data depending on material characteristic of the medium P, but the positional relation between the medium P and the opening portion 11 can be recognized although the reflections Pa, Pb are generated.

When all of the light sources 50 are turned on, it is determined whether a light source switch signal is received (Step ST23). In the case where it is determined that the light source switch signal is not received (Step ST23: No), determination is repeated until the light source switch signal is received, waiting until the light source switch signal is received. More specifically, in the case where it is determined that the shutter release button is pressed (Step ST2: Yes) (see FIG. 12), adjustment for a focal point, exposure, white balance (WB) is executed at the external device 3 (Step ST3). In other words, image capturing conditions for the image capturing unit 70 are set suitable for environment of the housing inner portion 12 by the image capturing control unit 75. Particularly, the image capturing control unit 75 executes the above adjustment for an area on the opposite side of the side where the reflections Pa, Pb are generated in both of the image data D1, D2 so as to obtain optimal image quality.

After execution of the above adjustment, the external device 3 subsequently transmits the light source switch signal (Step ST4). More specifically, the external device 3 transmits a first light source turn-on signal, namely, the light source switch signal to cause the light source control unit 61 of the housing 2 to turn on only the first light source 51, via the communication unit 77 of the external device 3 and the communication unit 62 of the housing 2. When the housing control unit 60 receives the first light source turn-on signal, it is determined that the light source switch signal is received (Step ST23: Yes) (see FIG. 13). When it is determined that the light source switch signal is received, the light source control unit 61 turns on only the first light source 51 based on the received first light source turn-on signal (Step ST24).

When only the first light source 51 is turned on, the light source control unit 61 determines again whether the light source switch signal is received (Step ST25). In the case of determining that the light source switch signal is not received (Step ST25: No), determination is repeated until the light source switch signal is received, waiting until the light source switch signal is received while keeping the first light source 51 turned on.

On the other hand, after the external device 3 transmits the first light source turn-on signal, the image capturing by the image capturing unit 70 is executed while only the first light source 51 is turned on (Step ST5) (see FIG. 12). In this case, the image processing unit 76 generates the first image data D1 for which no treatment is made to the reflection Pa corresponding to the first light source 51. Note that the image based on the first image data D1 may be displayed on the display unit 71 at the time of generating the first image data D1.

After the image is captured while only the first light source 51 is turned on, the external device 3 subsequently transmits the light source switch signal (Step ST6). More specifically, the external device 3 transmits a second light source turn-on signal, namely, the light source switch signal to cause the light source control unit 61 of the housing 2 to turn on only the second light source 52, via the communication unit 77 of the external device 3 and the communication unit 62 of the housing 2. When the housing control unit 60 receives the second light source turn-on signal, it is determined that the light source switch signal is received (Step ST25: Yes) (see FIG. 13). When it is determined that the light source switch signal is received, the light source control unit 61 turns off the first light source 51 and turns on only the second light source 52 based on the received second light source turn-on signal (Step ST26).

When only the second light source 52 is turned on, the light source control unit 61 determines again whether the light source switch signal is received (Step ST27). In the case where it is determined that the light source switch signal is not received (Step ST27: No), determination is repeated until the light source switch signal is received, waiting until the light source switch signal is received while keeping the second light source 52 turned on.

On the other hand, after the external device 3 transmits the second light source turn-on signal, the image capturing by the image capturing unit 70 is executed while only the second light source 52 is turned on (Step ST7) (see FIG. 12). In this case, the image processing unit 76 generates the second image data D2 for which no treatment is made to the reflection Pb corresponding to the second light source 52. Note that the image based on the second image data D2 may be displayed on the display unit 71 at the time of generating the second image data D2.

After the image is captured while only the second light source 52 is turned on, the external device 3 subsequently transmits the light source switch signal (Step ST8). More specifically, the external device 3 transmits an all light sources turn-off signal, namely, the light source switch signal to cause the light source control unit 61 of the housing 2 to turn off the second light source 52, via the communication unit 77 of the external device 3 and the communication unit 62 of the housing 2. When the housing control unit 60 receives the all light sources turn-off signal, it is determined that the light source switch signal is received (Step ST27: Yes) (see FIG. 13). When it is determined that the light source switch signal is received, the light source control unit 61 turns off the second light source 52 and all of the plurality of light sources 50 is turned off based on the received all light sources turn-off signal (Step ST28).

Figure 14:
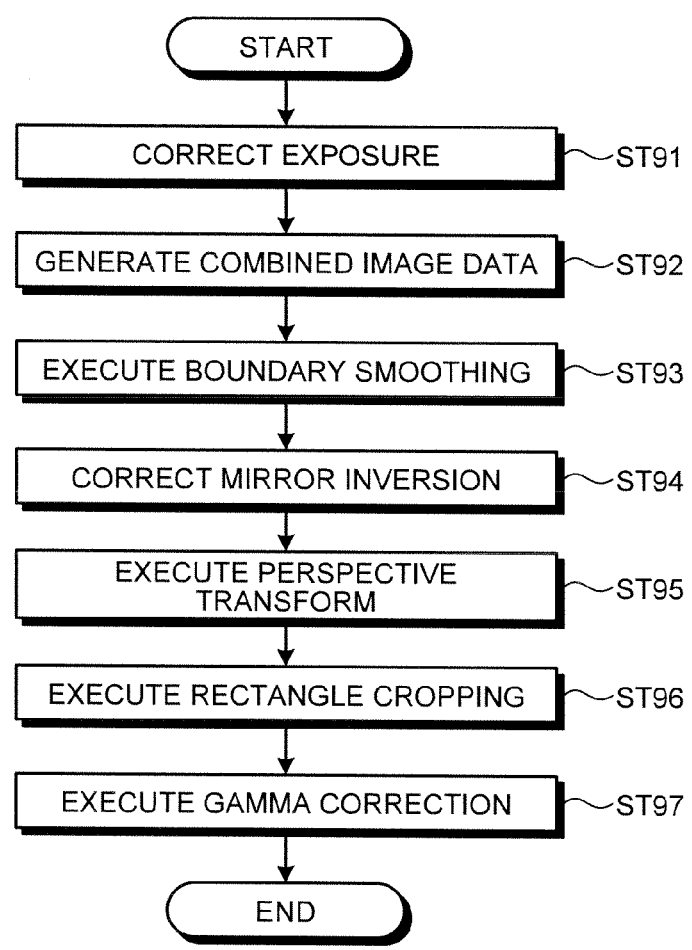
FIG. 14 is a flowchart illustrating an operating procedure related to image processing at the time of executing the reading operation by the image reading apparatus according to the first embodiment.

On the other hand, the external device 3 executes the image processing after transmitting the all light sources turn-off signal (Step ST9) (see FIG. 12). The image processing is executed by the image processing unit 76 included in the external device 3. FIG. 14 is a flowchart illustrating an operating procedure related to the image processing at the time of executing the reading operation at the image reading apparatus according to the first embodiment. The image processing unit 76 mainly executes generation of the combined image data DG and correction on the combined image data DG. When the image processing unit 76 executes the image processing, exposure of the image data is corrected first (Step ST91). More specifically, the image processing unit 76 corrects the exposure of at least one of the two image data D1, D2 such that brightness difference between both of the image data D1 and D2 becomes small. This can suppress the brightness difference occurring across the central line CL in the combined image data DG generated from both of the image data D1, D2.

Next, the image processing unit 76 generates the combined image data DG (Step ST92). More specifically, the image processing unit 76 generates the combined image data DG from the image data D1, D2 which have gone through the exposure correction. After generation of the combined image data DG, boundary smoothing is subsequently executed (Step ST93). The image processing unit 76 applies smoothing to a vicinity of the central line CL by executing at least one of known smoothing processing such as rectangle combination processing and feathering processing on pixel data at the boundary between the image data D1 and the image data D2, namely, the vicinity of the central line CL of the combined image data DG. This can prevent the combined image data DG from being recognizable as the image data generated by combining the two image data D1 and D2 across the central line CL of the combined image data DG.

After the boundary smoothing, mirror inversion correction is subsequently executed (Step ST94). More specifically, the image data generated by the image processing unit 76 is based on a mirror image vertically inverted because the image capturing unit 70 captures the image of the medium P via the mirror 27. Therefore, the image processing unit 76 executes a known correction on mirror inversion so as to vertically invert the combined image data DG.

After execution of the mirror inversion correction, the perspective transform is subsequently executed (Step ST95). More specifically, a distance between the mirror 27 and the opening portion 11 is varied by the position of the opening portion 11, and therefore, even in the case the opening portion 11 is rectangular shaped, the opening portion 11 is viewed as a trapezoid in the image captured by the image capturing unit 70 via the mirror 27. Therefore, the rectangular shaped image on the medium P becomes the trapezoid in the image data generated by the image processing unit 76. Accordingly, the image processing unit 76 executes the known perspective transform based on, for example, a deformed amount by preliminarily setting the deformed amount of a correspondent image in the image data for the image on the medium P based on the positional relation between the image capturing unit 70, mirror 27, and opening portion 11.

After execution of the perspective transform, the rectangle cropping is subsequently executed (Step ST96). For example, the image processing unit 76 executes a known rectangle cropping to extract an area corresponding to the reading target area Pt based on brightness difference between the area corresponding to the reading target area Pt and other areas in the combined image data DG. By this, the image processing unit 76 generates the combined image data DG formed only of the area corresponding to the reading target area Pt.

After execution of the rectangle cropping, the gamma correction is subsequently executed (Step ST97). More specifically, the image processing unit 76 applies, to the combined image data DG, known gamma correction suitable to properties of the display unit 71 of the external device 3 or properties of a standard display unit.

After executing the image processing in above steps at the image processing unit 76, the external device 3 displays an image based on the combined image data DG on the display unit 71 (Step ST10) (see FIG. 12). In other words, the image based on the combined image data DG applied with various kinds of processing is displayed on the display unit 71. Next, the combined image data DG is saved (Step ST11). More specifically, the combined image data DG which has gone through the various kinds of processing is saved by being stored in the storage unit of the external device 3. After the combined image data DG is saved, the procedure returns to Step ST2, and whether the shutter release button is pressed is determined, thereby waiting until a next reading command is provided.

Meanwhile, as for the boundary smoothing, various kinds of corrections, and rectangle cropping executed at the time of image processing, it is preferable that necessity of execution of respective procedures of the boundary smoothing, the various kinds of corrections, and the rectangle cropping can be determined or various kinds of setting can be executed by operating icons on the display unit 71 displayed by the reading application. Further, preferably, saving the combined image data DG, namely, storing the combined image data DG in the storage unit is commanded by the user operating the icons on the display unit 71 displayed by the reading application.

Figure 15:
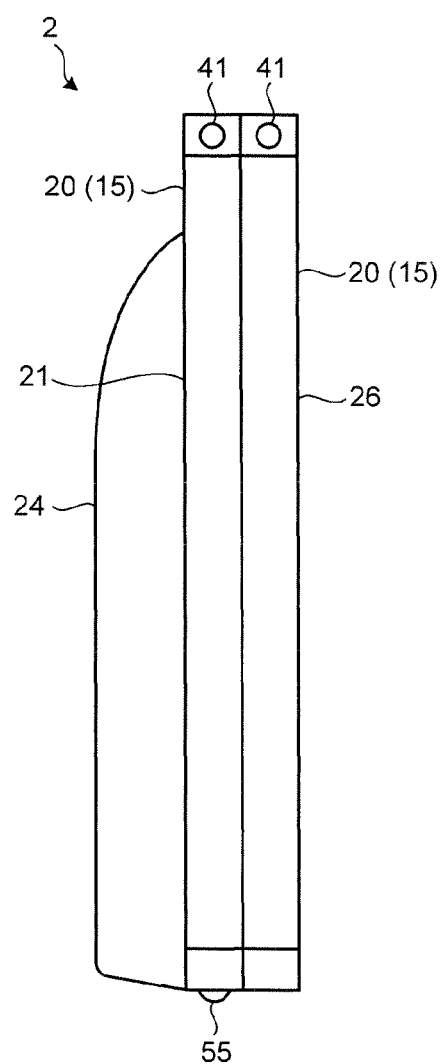
FIG. 15 is a side view of the housing in a folded state.
Figure 16:
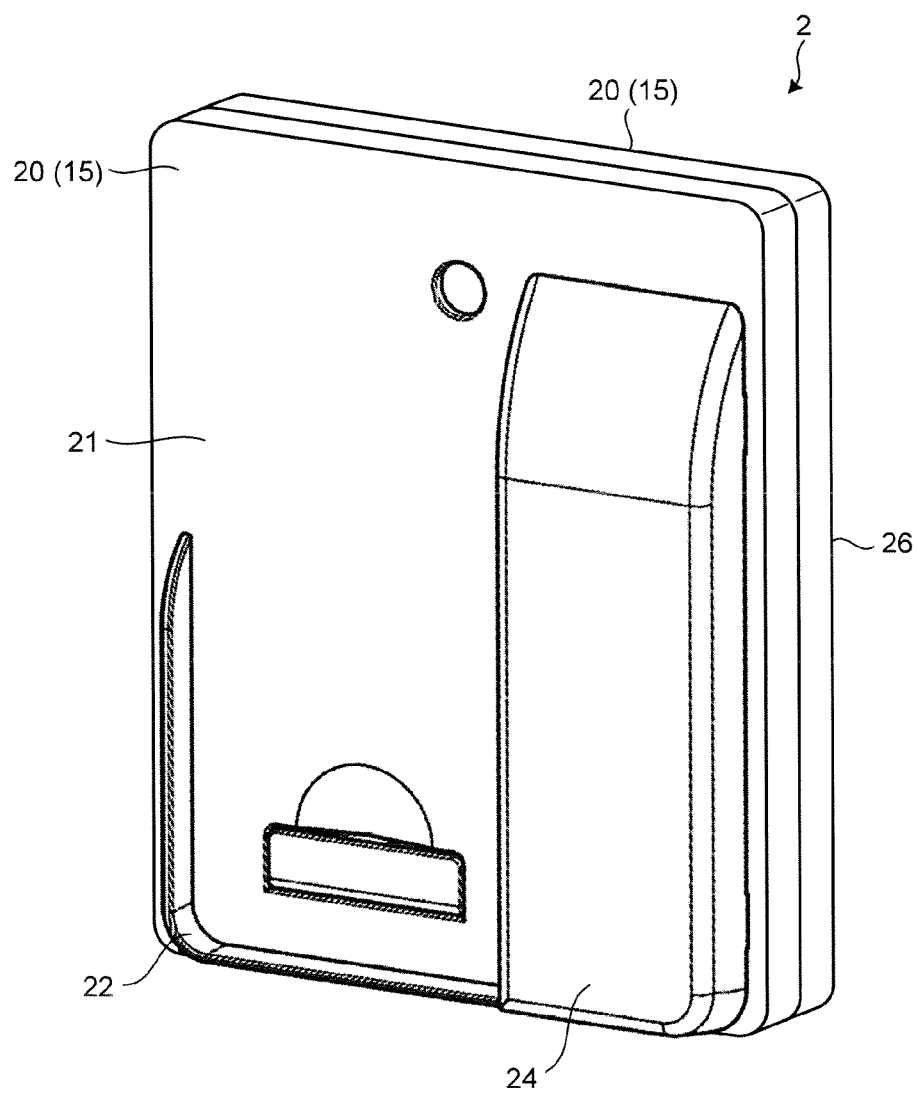
FIG. 16 is a perspective view of the housing illustrated in FIG. 15.

The image reading apparatus 1 reads the image of the medium P and stores the image in the storage unit of the external device 3 as described above, but in the case of not reading the medium P, namely, in the case of not using the image reading apparatus 1, the housing 2 can be folded. FIG. 15 is a side view of the housing in the folded state. FIG. 16 is a perspective view of the housing illustrated in FIG. 15. When the housing 2 is folded, the two inclined-cover portions 20 are rotated around the rotary axes 41 and the inclined-cover portions 20 are relatively moved to each other, thereby placing the inclined-cover portions 20 close to each other. At this point, the connecting-cover portions 30 located between the inclined-cover portions 20 and connected to both of the inclined-cover portions 20 enter the gap between the inclined-cover portions 20 by being transformed with respect to the inclined-cover portions 20.

In other words, when the housing 2 is folded, the two inclined-cover portions 20 are respectively rotated around the rotary axes 41 in a direction such that the end portion sides of the two inclined-cover portions 20 on the side where the opening portion 11 is located come close to each other. By this, at each of the connecting-cover portions 30 connected to the two inclined-cover portions 20, a distance between connecting portions connecting each of the connecting-cover portions 30 with the inclined-cover portions 20 decreases.

More specifically, the connecting-cover portion 30 has the two swing members 31 connected to the two inclined-cover portions 20 respectively in a swingable manner, and the two swing members 31 are mutually connected in a swingable manner by the connecting members 35. Therefore, in the case where the distance between the connecting portions connecting each of the connecting-cover portions 30 with the inclined-cover portions 20 decreases, the connecting-cover portions 30 enter the gap between the inclined-cover portions 20 by the swing members 31 swinging each other while the swing members 31 swing with respect to the inclined-cover portions 20. In other words, in the case of viewing an entire connecting-cover portion 30, portions where the connecting members 35 are located are transformed by being bent in a direction moving close to the other connecting-cover portion 30, thereby the connecting-cover portion 30 enters the gap between the two inclined-cover portions 20.

When the inclined-cover portions 20 are oriented parallel to each other by rotating the two inclined-cover portions 20 in the direction that the inclined-cover portions 20 come close to each other, the connecting-cover portions 30 that enter the gap between the inclined-cover portions 20 also have the swing members 31 oriented parallel to the inclined-cover portions 20. Since the connecting-cover portions 30 enter the gap between the inclined-cover portions 20 in this manner, the two inclined-cover portions 20 are superimposed, and in the case of viewing the entire housing 2, the housing 2 is shaped in a substantially rectangular board whose thickness is sum of the thickness of the two inclined-cover portions 20. Therefore, the housing 2 is formed compact.

In the above-described image reading apparatus 1 according to the first embodiment, the housing 2 includes the two inclined-cover portions 20 and the two connecting-cover portions 30. The inclined-cover portions 20 can be switched between the open state and the folded state by the inclined-cover portion 20 relatively moving with respect to the other inclined-cover portion 20, basing the end portion sides on the opposite side of the side where the opening portion 11 is located. With this configuration, when the inclined-cover portions 20 are in the open state, the ambient light emitted to the medium P can be shielded by the four cover portions 15. Therefore, the image with stable image quality can be read by the external device 3. Further, when the inclined-cover portions 20 are in the folded state, the connecting-cover portions 30 enter the gap between the inclined-cover portions 20. Therefore, the inclined-cover portions 20 can be oriented parallel and adjacent to each other, and the inclined-cover portions 20 can be formed compact being superimposed each other. As a result, portability of the image reading apparatus 1 can be secured, and further the image can be read ensuring image quality. Further, since the housing 2 can be folded as described above, when the image reading apparatus 1 is not used, the image reading apparatus can be conveniently carried around by being folded and also can be stored in a space-saving manner.

Moreover, the two inclined-cover portions 20 are switched between the open state and the folded state by being respectively rotated around the different rotary axes 41. Therefore, the state can be optionally changed by surely rotating the two inclined-cover portions 20 around the respective rotary axes 41. As a result, both securing portability and reading images with ensured image quality can be surely achieved.

Furthermore, the connecting-cover portions 30 are formed by each one of the connecting-cover portions 30 including the plurality of swing members 31. When the inclined-cover portions 20 are in the folded state, the connecting-cover portions 30 are oriented parallel to the inclined-cover portions 20 by the swing members 31 being relatively swung each other. Therefore, the connecting-cover portions 30 can be more surely made to enter the gap between the inclined-cover portions 20. As a result, portability of the image reading apparatus 1 can be more surely improved.

Second Embodiment

An image reading apparatus 80 according to a second embodiment has a configuration substantially same as an image reading apparatus 1 according to a first embodiment, but is characterized in being capable of changing a length of an inclined-cover portion 20. The rest of configurations are same as the first embodiment. Therefore, a description therefor will be omitted, denoting same components by the same reference signs.

Figure 17:
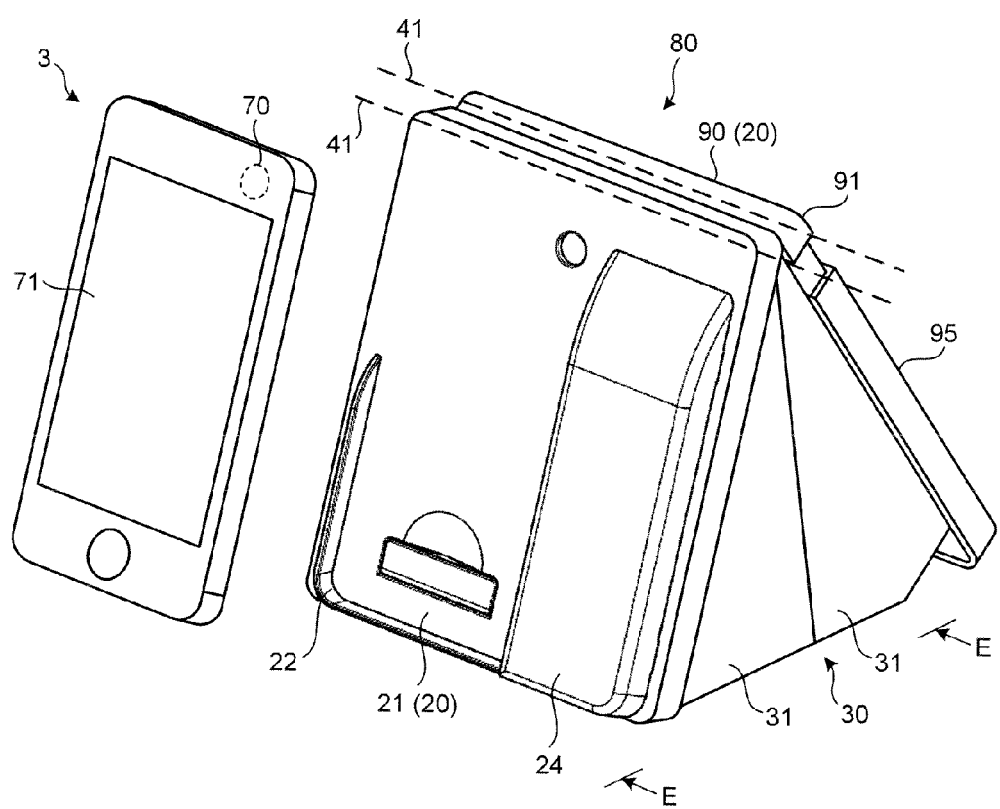
FIG. 17 is a perspective view of an image reading apparatus according to a second embodiment.
Figure 18:
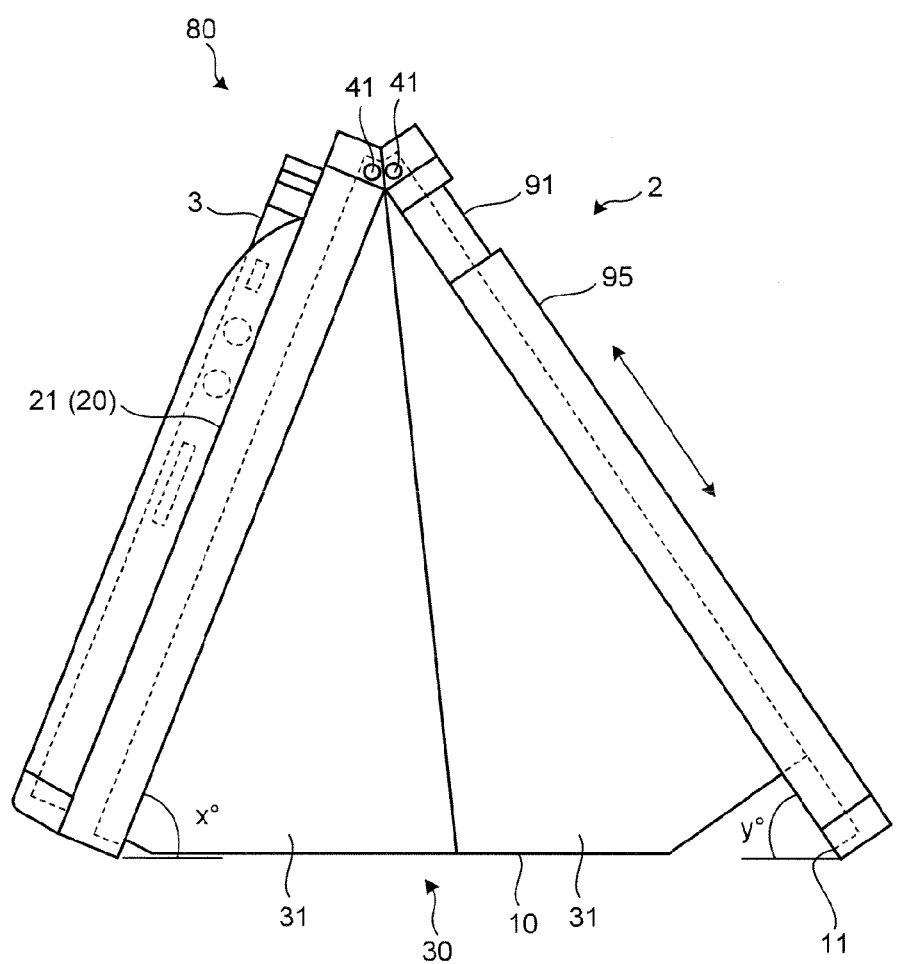
FIG. 18 a diagram viewed from an arrow direction of line E-E in FIG. 17.

FIG. 17 is a perspective view of the image reading apparatus according to the second embodiment. FIG. 18 a diagram viewed from an arrow direction of line E-E in FIG. 17. The image reading apparatus 80 according to the second embodiment includes a housing 2 and an external device 3 same as the image reading apparatus 1 according to the first embodiment, and at the time of reading an image of a medium P, the image is read by capturing the image by the external device 3 while holding the external device 3 at the housing 2. Further, the housing 2 includes the two inclined-cover portions 20 and two connecting-cover portions 30, and the inclined-cover portions 20 can be switched between an open state and a folded state by being rotated around a rotary axis 41. The open state is the state at the time of reading the image of the medium P, and the folded state is the state at the time of carrying or storing the apparatus. Further, as for the connecting-cover portions 30, one connecting-cover portion 30 includes two swing members 31 mutually connected in a swingable manner, and the two swing members 31 are respectively connected to the different inclined-cover portions 20 in a swingable manner.

Further, in the image reading apparatus 80 according to the second embodiment, a second inclined-cover portion 90 out of the two inclined-cover portions 20 included in the housing 2 has the length that can be changed in a direction from an end portion on a side where an opening portion 11 is located to an end portion on the other side. Since the length of the second inclined-cover portion 90 can be thus changed, the swing member 31 connected to the second inclined-cover portion 90 out of the swing members 31 included in the connecting-cover portion 30 has the end portion side on the opening portion 11 side is cut off at the portion connected to the second inclined-cover portion 90 so as to absorb change of the length of the second inclined-cover portion 90.

At the time of reading the image of the medium P by the image reading apparatus 80, the image is read in a state that the length of the second inclined-cover portion 90 in the direction from the end portion on the side where the opening portion 11 is located to the end portion on the other side is elongated longer than a length of the first inclined-cover portion 21. Therefore, an angle y° formed between the second inclined-cover portion 90 and a side of the connecting-cover portion 30 on the opening portion 11 side is smaller than an angle x° formed between the first inclined-cover portion 21 and the side of the connecting-cover portion 30 on the opening portion 11 side.

Figure 19:
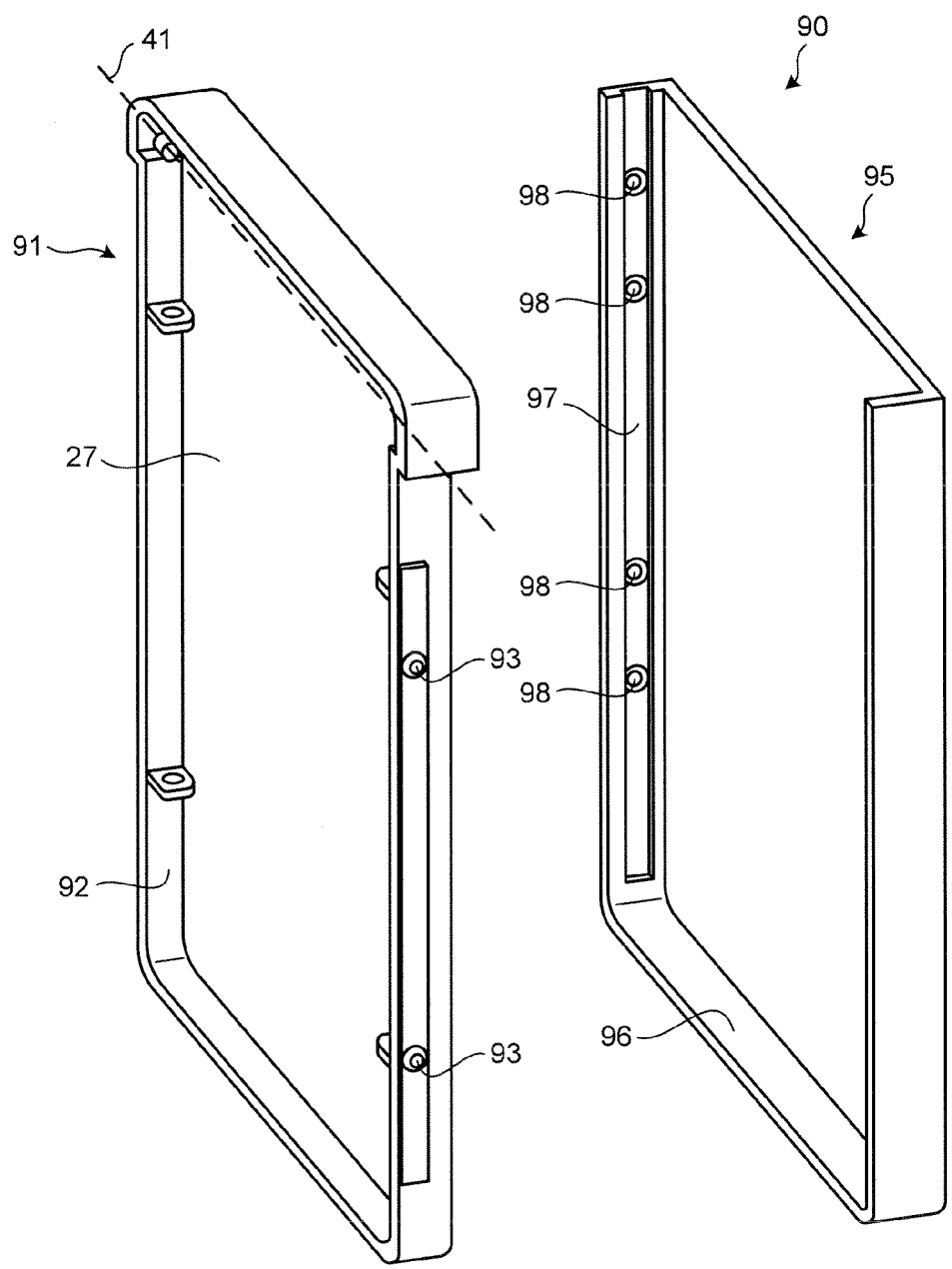
FIG. 19 is an exploded perspective view of a second inclined-cover portion illustrated in FIG. 17.

FIG. 19 is an exploded perspective view of the second inclined-cover portion illustrated in FIG. 17. The second inclined-cover portion 90 having the changeable length includes a base portion 91 and a slide portion 95. Among these components, the base portion 91 is formed in a substantially rectangular shape, and a vicinity of one side of the rectangular shape is connected to the rotatable-cover portion 40. In other words, the base portion 91 is a member at the second inclined-cover portion 90, connected to the rotatable-cover portion 40 in a manner rotatable around the rotary axis 41. The base portion 91 thus connected to the rotatable-cover portion 40 includes a base-portion-frame section 92 which is a frame-like member configured to surround a rectangular shape plate at a periphery of a substantially rectangular shaped plate-like member, and has a mirror 27 disposed on a surface on a side facing the first inclined-cover portion 21.

Additionally, the base-portion-frame section 92 includes projections 93 on an outer side portion of the base-portion-frame section 92 corresponding to two sides out of four sides of the rectangle which is the shape of the base portion 91, and the two sides are located on both sides in an extending direction of the rotary axis 41. The projections 93 project in an outer direction of the rectangle at portions. The projections 93 are disposed at plural points on each of the sides where the projections 93 are disposed.

Further, the slide portion 95 is formed of a substantially rectangular-shaped plate-like member having a size same as the base portion 91. The slide portion 95 includes a slide-portion-frame section 96 having a shape of frame which surrounds the substantially rectangular-shaped plate-like member at a portion corresponding to three sides on a periphery of the substantially rectangular shape plate-like member. More specifically, the slide-portion-frame section 96 is disposed on the three sides out of four sides of the substantially rectangular-shaped slide portion 95. The three sides are sides corresponding to the three sides of the base portion 91 which are other than the side where the rotary axis 41 is located.

Further, the slide-portion-frame section 96 includes grooves 97 where the projections 93 formed at the base-portion-frame section 92 are inserted. The base-portion-frame section 92 is provided at the four sides of the rectangle shape of the base portion 91, and the grooves 97 are formed at an inner portion of the slide-portion-frame section 96 at portions corresponding to the sides of the base-portion-frame sections 92 where the projections 93 are located. The grooves 97 are formed along the sides where the slide-portion-frame section 96 to be formed with the grooves 97 is disposed. Further, in the groove 97, a plurality of engagement holes 98 which the projections 93 enter is formed. The engagement holes 98 are formed at positions where the inclined-cover portions 20 are in the open state and the projections 93 enter the engagement holes 98, and also at positions where the inclined-cover portions 20 are in the folded state and the projections 93 enter the engagement holes 98. Note that both of the base portion 91 and the slide portion 95 are made of material having elasticity such as resin material or plastic, and the base portion 91 and the slide portion 95 can be elastically deformed by applying predetermined force, thereby enabling the projections 93 to enter the engagement holes 98 and come off the engagement holes 98.

In the second inclined-cover portion 90, both the base portion 91 and the slide portion 95 are integrally formed such that the slide portion 95 overlaps or overlays the base portion 91 from an opposite side surface to a surface of the base portion 91 where the mirror 27 is disposed. At this point, the base-portion-frame section 92 and the slide-portion-frame section 96 are in a state that the slide-portion-frame section 96 is positioned on outer side of the base-portion-frame section 92 and the base-portion-frame section 92 and the slide-portion-frame section 96 are superimposed in the extending direction of the rotary axis 41, having the projections 93 of the base-portion-frame section 92 entered the grooves 97 of the slide-portion-frame section 96.

With this configuration, the projections 93 can be relatively moved along the grooves 97 in a direction the grooves 97 are formed, thereby enabling the base-portion-frame section 92 and the slide-portion-frame section 96 to relatively move in the direction that the grooves 97 are formed, namely, in the direction from the end portion where the opening portion 11 is located to the end portion on the other side. By this, in the second inclined-cover portion 90, the slide portion 95 is connected to the base portion 91 in a slidable manner.

The image reading apparatus 80 according to the second embodiment has the configuration as described above, and operation thereof will be described below. At the time of reading the image of the medium P by the image reading apparatus 80, the housing 2 is set in the open state, and in the second inclined-cover portion 90, the slide portion 95 is slid over the base portion 91 in a direction away from the rotary axis 41. In the case of sliding the slide portion 95 over the base portion 91 in the direction away from the rotary axis 41, among the engagement holes 98 disposed at the plural points of the slide portion 95, the projections 93 disposed at the base portion 91 enter the engagement holes 98 disposed at the positions which the projections 93 enter at the time of the open state, and consequently, the projections 93 are engaged with the engagement holes 98. By this, the slide portion 95 is fixed at a desired position in the case of sliding the slide portion 95 in the direction away from the rotary axis 41.

In other words, some of the engagement holes 98 are formed on the slide portion 95 at positions where the projections 93 enter when the slide portion 95 is slid and the length of the second inclined-cover portion 90, in the direction from the end portion where the opening portion 11 is located to the end portion on the other side, becomes a length suitable for reading the image of the medium P. In this state, a relation between medium P, the mirror 27, and the image capturing unit 70 of the external device 3 held at the first inclined-cover portion 21 can be made suitable for image capturing. Therefore, an image having high image quality can be captured at the time capturing the image of the medium P by the image capturing unit 70 via the mirror 27.

Figure 20:
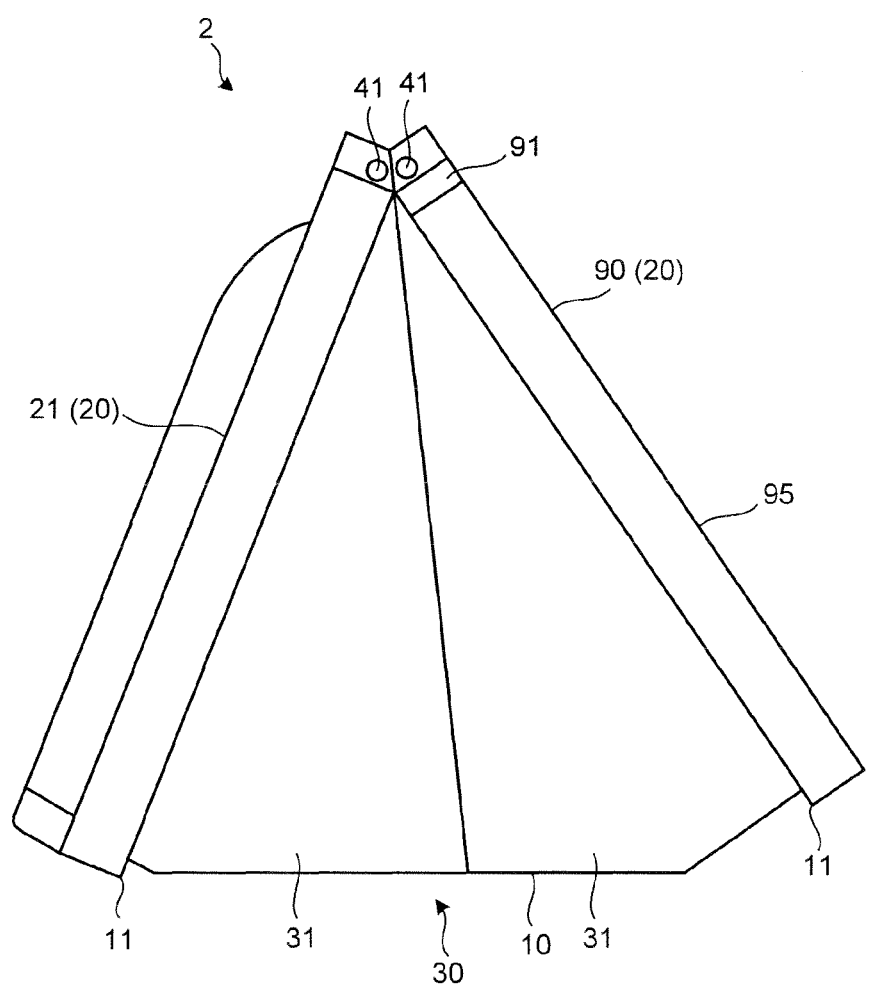
FIG. 20 is an explanatory diagram for the case where a length of the second inclined-cover portion is shortened illustrated in FIG. 17.

FIG. 20 is an explanatory diagram in the case where the length of the second inclined-cover portion illustrated in FIG. 17 is shortened. At the time of setting the inclined-cover portions 20 in the folded state, the slide portion 95 of the second inclined-cover portion 90 is first slid to the side where the rotary axis 41 is located to shorten the length of the second inclined-cover portion 90, in the direction from the end portion on the side where the opening portion 11 is located to the end portion on the other side. At this point, among the swing members 31 included in the connecting-cover portion 30, the swing member 31 connected to the second inclined-cover portion 90 has a notch at the end portion side on the opening portion 11 side of the portion connected to the second inclined-cover portion 90. Therefore, the slide portion 95 is slidable preventing the slide-portion-frame section 96 from contacting the swing member 31.

In the case of thus sliding the slide portion 95 over the base portion 91 in the direction approaching the rotary axis 41, among the plurality of engagement holes 98 disposed at the slide portion 95, the projections 93 disposed at the base portion 91 enter the engagement holes 98 disposed at the positions where the projections 93 enter at the time of the folded state, and the projections 93 are engaged with the engagement holes 98. By this, the slide portion 95 is fixed at a desired position in the case of sliding the slide portion 95 in the direction closer to the rotary axis 41.

More specifically, some of the engagement holes 98 are formed at the slide portion 95 at positions where the projections 93 enter when the slide portion 95 is slid and the length of the second inclined-cover portion 90, in the direction from the end portion where the opening portion 11 is located to the end portion on the other side, becomes almost same as a length of the first inclined-cover portion 21. Therefore, in the case of sliding the slide portion 95 over the base portion 91 in the direction approaching the rotary axis 41, the slide portion 95 is fixed at a position where the length of the second inclined-cover portion 90 becomes almost same as the length of the first inclined-cover portion 21.

Figure 21:
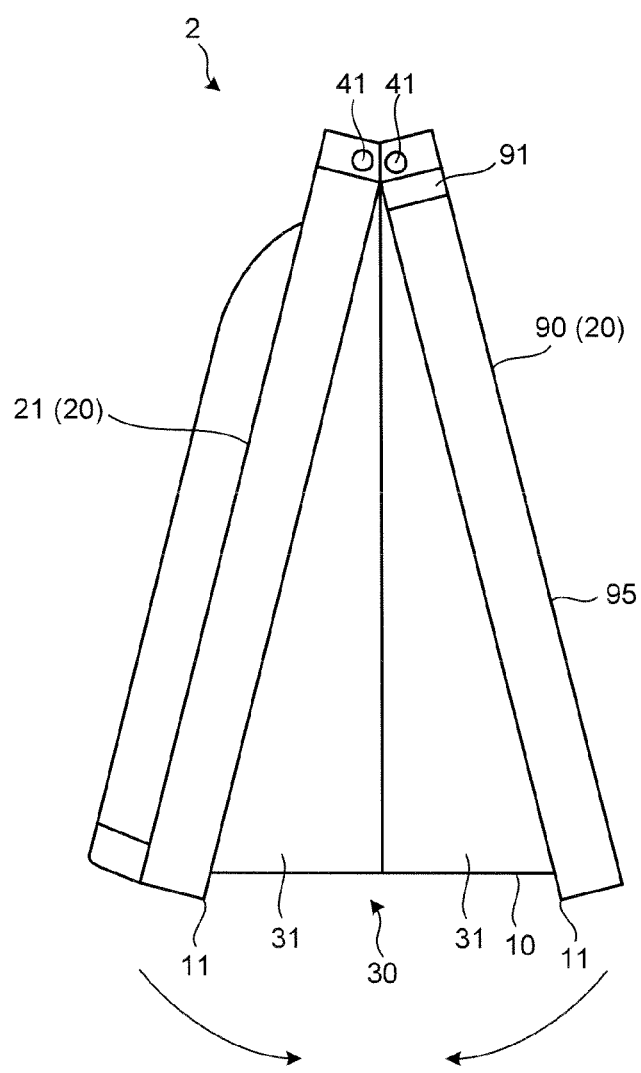
FIG. 21 is an explanatory diagram for the case where the inclined-cover portion is going to be set in a folded state illustrated in FIG. 20.
Figure 22:
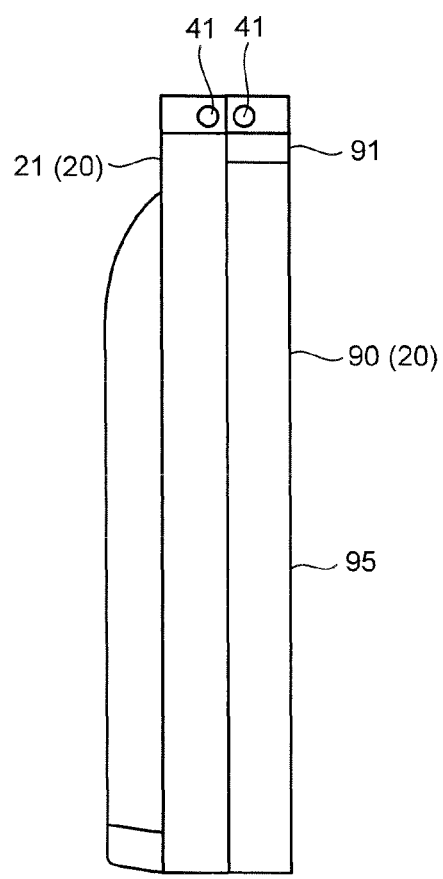
FIG. 22 is an explanatory diagram for the case where the inclined-cover portion has been set in the folded state illustrated in FIG. 21.

FIG. 21 is an explanatory diagram for the case where the inclined-cover portions are being brought to a folded state illustrated in FIG. 20. FIG. 22 is an explanatory diagram for the case where the inclined-cover portions illustrated in FIG. 21 have come to the folded state. At the time of bringing the inclined-cover portions 20 included in the housing 2 to the folded state, the first inclined-cover portion 21 and the second inclined-cover portion 90 are mutually rotated around the rotary axes 41 in a direction that the both inclined-cover portions approach each other. In this case, the connecting-cover portions 30 located between the first inclined-cover portion 21 and the second inclined-cover portion 90 and connected to both of the inclined-cover portions enter gap between the inclined-cover portions 20 by the mutually connected swing members 31 being rotated and also the swing members 31 being rotated with respect to the inclined-cover portions 20.

By this movement, the first inclined-cover portion 21 and the second inclined-cover portion 90 are oriented parallel and superimposed. At this point, the length of the second inclined-cover portion 90 becomes almost equal to the length of the first inclined-cover portion 21 by sliding the slide portion 95 in the direction approaching the rotary axis 41. Therefore, the housing 2 set in the folded state has the first inclined-cover portion 21 and the second inclined-cover portion 90 superimposed having almost the same shape in a plane view. As a result, in the case of viewing the entire housing 2, the housing 2 is formed compact, shaped in a substantially rectangular board whose thickness is sum of the two inclined-cover portions 20.

Since the length of the second inclined-cover portion 90 can be changed in the above-described image reading apparatus 80 according to the second embodiment, the length of the second inclined-cover portion 90 can be changed to a length suitable for each of the open state and the folded state of the inclined-cover portions 20. In other words, the compact form can be secured at the time of setting the inclined-cover portions 20 in the folded state while the relation between the mirror 27, medium P, and image capturing unit 70 of the external device 3 can be made more optimal for image capturing at the time of setting the inclined-cover portions in the open state. As a result, portability of the image reading apparatus 80 can be secured and the image can be read with higher image quality.

MODIFIED EXAMPLES

Figure 23:
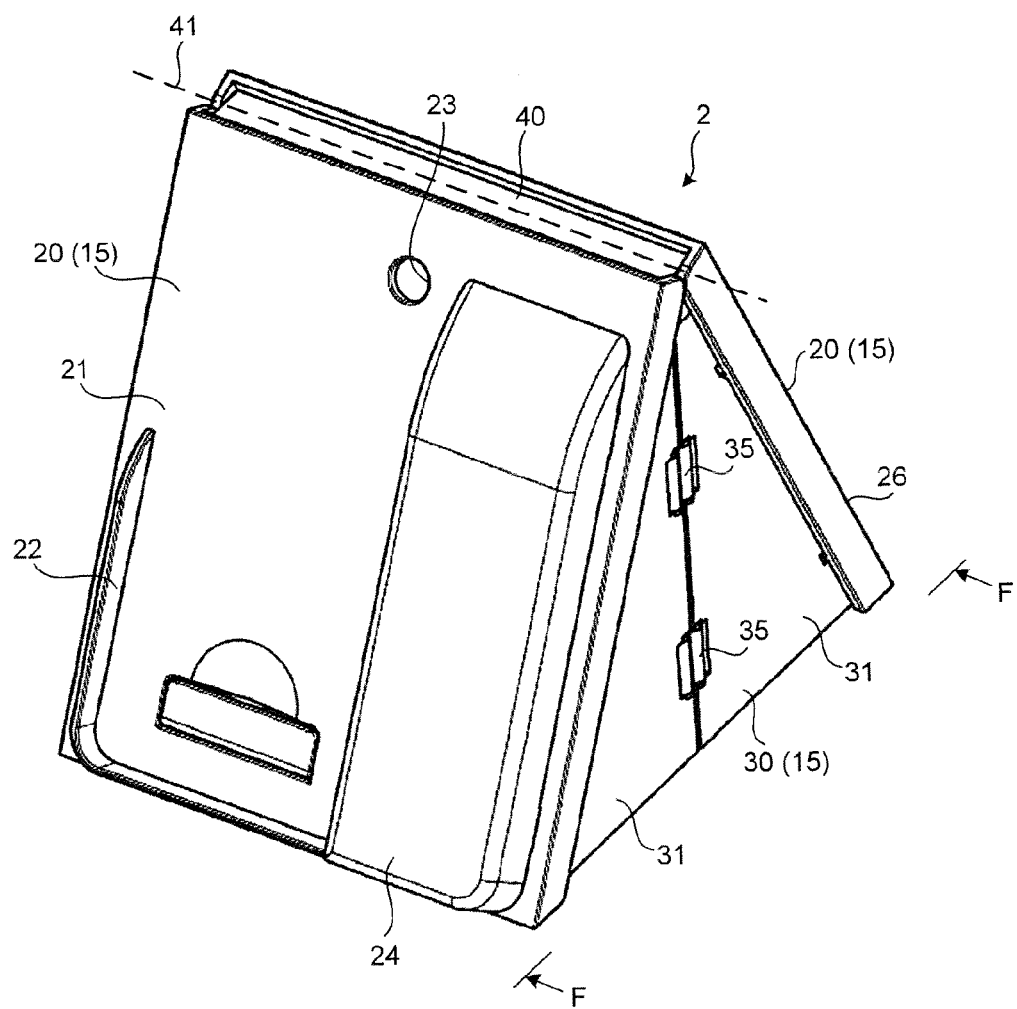
FIG. 23 is an explanatory diagram illustrating a modified example of the image reading apparatus according to the first embodiment and is a perspective view of the housing in the case of having one rotary axis.
Figure 24:
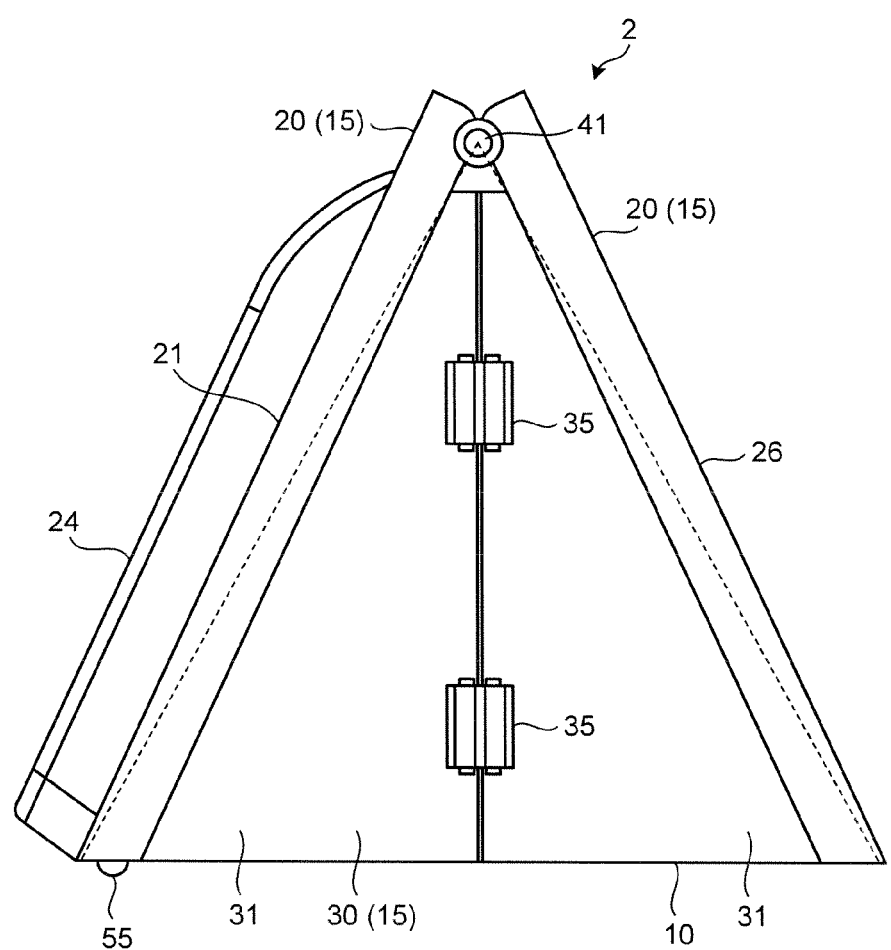
FIG. 24 is a diagram viewed from an arrow direction of line F-F in FIG. 23.

Meanwhile, in the image reading apparatus 1 according to the first embodiment, the two inclined-cover portions 20 included in the housing 2 can be respectively rotated around the different rotary axes 41, but the rotary axis 41 of the inclined-cover portion 20 is not necessarily provided for each of the inclined-cover portion 20. FIG. 23 is an explanatory diagram illustrating a modified example of the image reading apparatus according to the first embodiment and is a perspective view of the housing in the case of having one rotary axis. FIG. 24 is a diagram viewed from an arrow direction of line F-F in FIG. 23. The two inclined-cover portions 20 included in the housing 2 may be configured capable of being switched between the open state and the folded state by respectively being rotated around a shared rotary axis 41 as illustrated in FIGS. 23 and 24. More specifically, the two inclined-cover portions 20 may be connected to one rotatable-cover portion 40 so as to be rotated around the shared virtual rotary axis 41. By configuring the two inclined-cover portions 20 to be rotated around the one rotary axis 41, a form at the portion related to rotation of the inclined-cover portions 20 can be simplified and manufacturing cost can be reduced.

Figure 25:
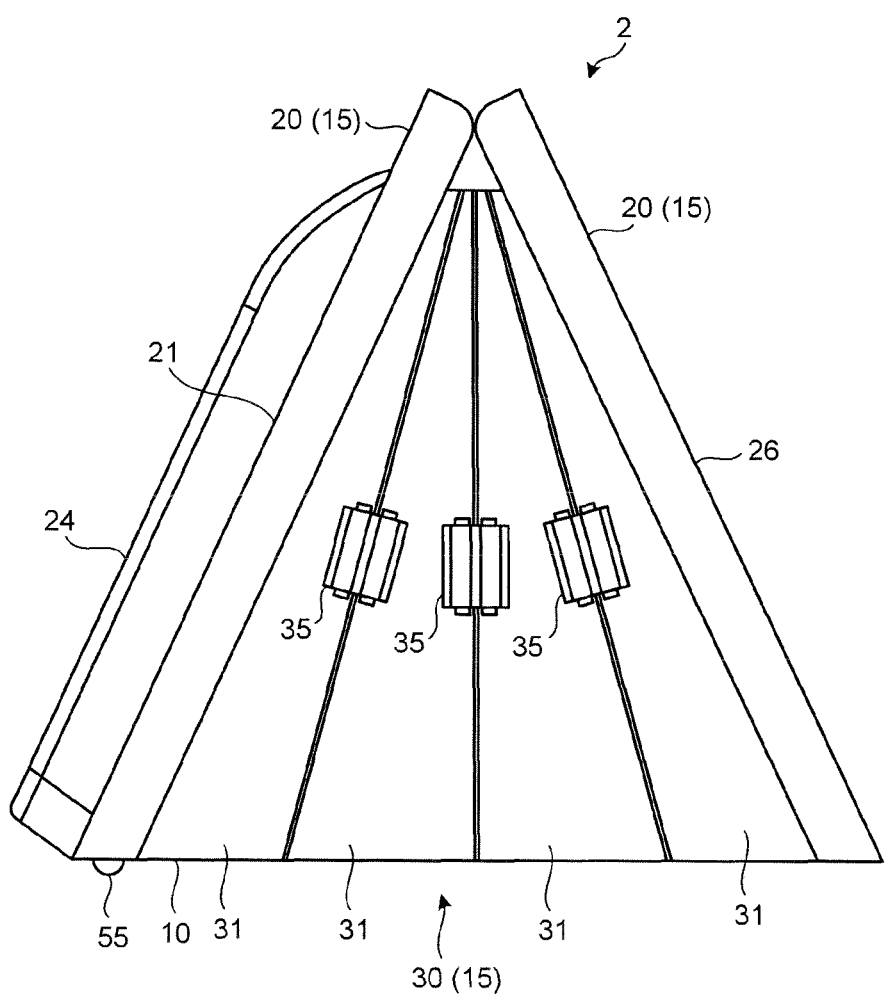
FIG. 25 is an explanatory diagram illustrating a modified example of the image reading apparatus according to the first embodiment and is an explanatory diagram for the case where a connecting-cover portion is formed by including four swing members.

Further, in the image reading apparatus 1 according to the first embodiment, each of the connecting-cover portions 30 is formed by including the two swing members 31, but the number of the swing members 31 constituting one connecting-cover portion 30 may be other than two. FIG. 25 is an explanatory diagram illustrating a modified example of the image reading apparatus according to the first embodiment, and is an explanatory diagram for the case where a connecting-cover portion 30 is formed by including four swing members 31. For example, one connecting-cover portion 30 may be formed by including the four swing members 31 as illustrated in FIG. 25. In this case, the four swing members 31 are disposed such that the four swing members 31 are aligned between the two inclined-cover portions 20 in the case of setting the two inclined-cover portions 20 in the open state, and the swing members 31 adjacent to the inclined-cover portions 20 are connected to the inclined-cover portions 20 in a swingable manner. Further, the swing members 31 adjacent to each other are connected by the connecting members 35 in a swingable manner. In this case also, at the time of setting the inclined-cover portions 20 in the folded state, the connecting-cover portions 30 are oriented parallel to the two inclined-cover portions 20 and enter the gap between the inclined-cover portions 20 by the swing members 31 being swung with respect to the inclined-cover portions 20 and also the swing members 31 being relatively swung one another.

Here, in the case where one connecting-cover portion 30 is formed of the four swing members 31, a width of one swing member 31 in a direction between the inclined-cover portions 20 when the inclined-cover portions 20 are in the open state is narrower than the width of one swing member 31 in the case where one connecting-cover portion 30 is formed of the two swing members 31. Therefore, the width of the swing member 31 in a direction between the connecting-cover portions 30 in the case where the swing member 31 is oriented parallel to the inclined-cover portions 20 by setting the inclined-cover portions 20 in the folded state is narrower than the width in the case where one connecting-cover portion 30 is formed of the two swing members 31.

With this configuration, in the case where one connecting-cover portion 30 is formed of the four swing members 31, the two connecting-cover portions 30 have a smaller projecting amount of one connecting-cover portion 30, in the direction to the other connecting-cover portion 30 in the case of setting the inclined-cover portions 20 in the folded state, than the projecting amount in the case where one connecting-cover portion 30 is formed of the two swing members 31. Therefore, the connecting-cover portions 30 hardly contact each other in the case of setting the inclined-cover portions 20 in the folded state, and therefore, the connecting-cover portions 30 do not need to have a cut-off portion for the case where the connecting-cover portions 30 mutually contact each other.

More specifically, in the case where one connecting-cover portion 30 is formed of the two swing members 31, it is necessary to cut off the section where the connecting-cover portions 30 may contact each other when the inclined-cover portions 20 are set in the folded state. However, such cut-off portion becomes unnecessary by forming one connecting-cover portion 30 with the four swing members 31. With this configuration, ambient light can be more surely prevented from irradiating the housing inner portion 12 when the inclined-cover portions 20 are set in the open state, and the image of the medium P can be more surely read with stable image quality. Further, in the case where the inclined-cover portions 20 are set in the folded state, the connecting-cover portions 30 hardly contact each other. Therefore, the housing 2 can be downsized, and portability of the image reading apparatus 1 can be more surely improved.

Figure 26:
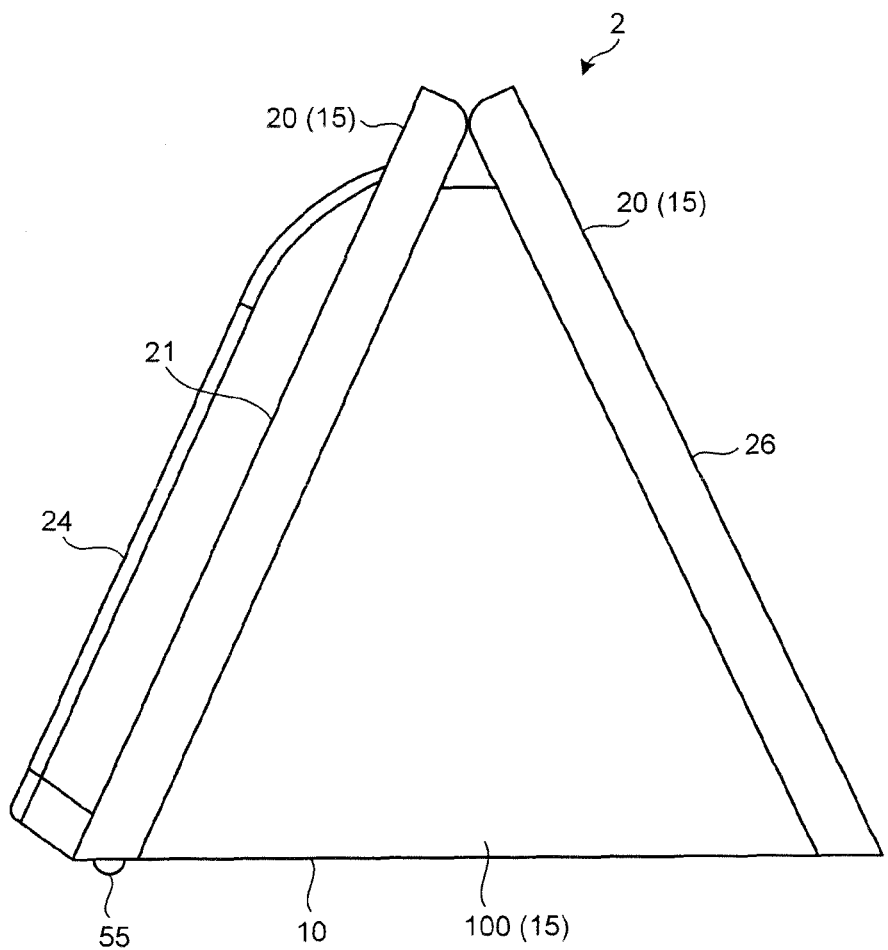
FIG. 26 is an explanatory diagram illustrating a modified example of the image reading apparatus according to the first embodiment and is an explanatory diagram for the case where the connecting-cover portion is formed of a flexible member.

Further, the connecting-cover portion included in the housing 2 may be configured in a manner other than connecting the plurality of swing members 31 in a swingable manner. FIG. 26 is an explanatory diagram illustrating a modified example of the image reading apparatus according to the first embodiment, and is an explanatory diagram for the case where the connecting-cover portion is formed of a flexible member. A connecting-cover portion 100 is formed of, for example, the flexible member such as resin material, i.e. plastic, or rubber material. In other words, the connecting-cover portion 100 may be formed of one transformable member made of the flexible material instead of being transformable by combining a plurality of members made of rigid materials. By forming the connecting-cover portion 100 of such a flexible member, when the two inclined-cover portions 20 are set in the folded state, the connecting-cover portion 100 is bent at the time of entering the gap between the inclined-cover portions 20 by being transformed with respect to the inclined-cover portions 20. As a result, the connecting-cover portion 100 can be oriented parallel to the two inclined-cover portions 20.

For example, when the two inclined-cover portions 20 are set in the folded state, the connecting-cover portion 100 is bent at a position near a middle of the direction between the inclined-cover portions 20, thereby orienting the connecting-cover portion 100 parallel to the inclined-cover portions 20 and causing the connecting-cover portion 100 to enter the gap between the inclined-cover portions 20. More specifically, when the two inclined-cover portions 20 are set in the folded state, the connecting-cover portion 100 is made to enter the gap between the inclined-cover portions 20 by being bent near the place corresponding to a portion where the two swing members 31, included in the connecting-cover portion 30, of the image reading apparatus 1 according to the first embodiment are connected.

By thus forming the connecting-cover portion 100 of the flexible member, the connecting-cover portion 100, which may be transformed when the inclined-cover portions 20 are switched between the open state and the folded state, and may enter the gap between the inclined-cover portions 20 at the time of the folded state, can be formed of one member. With this configuration, the number of components can be reduced, and further man-hour at the time of manufacture can be reduced. As a result, manufacturing cost can be reduced.

Figure 27:
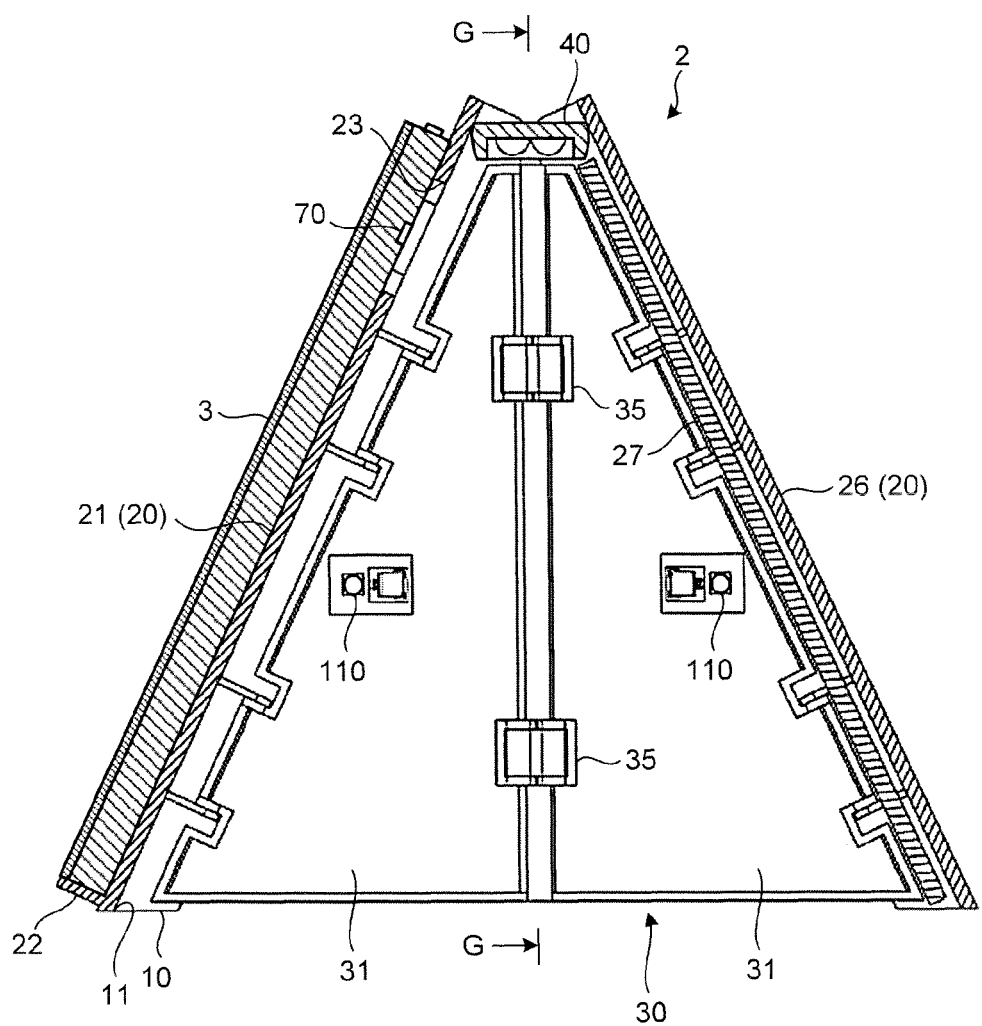
FIG. 27 is an explanatory diagram illustrating a modified example of the image reading apparatus according to the first embodiment and is an explanatory diagram for the case where a light source is formed of a point light source.
Figure 28:
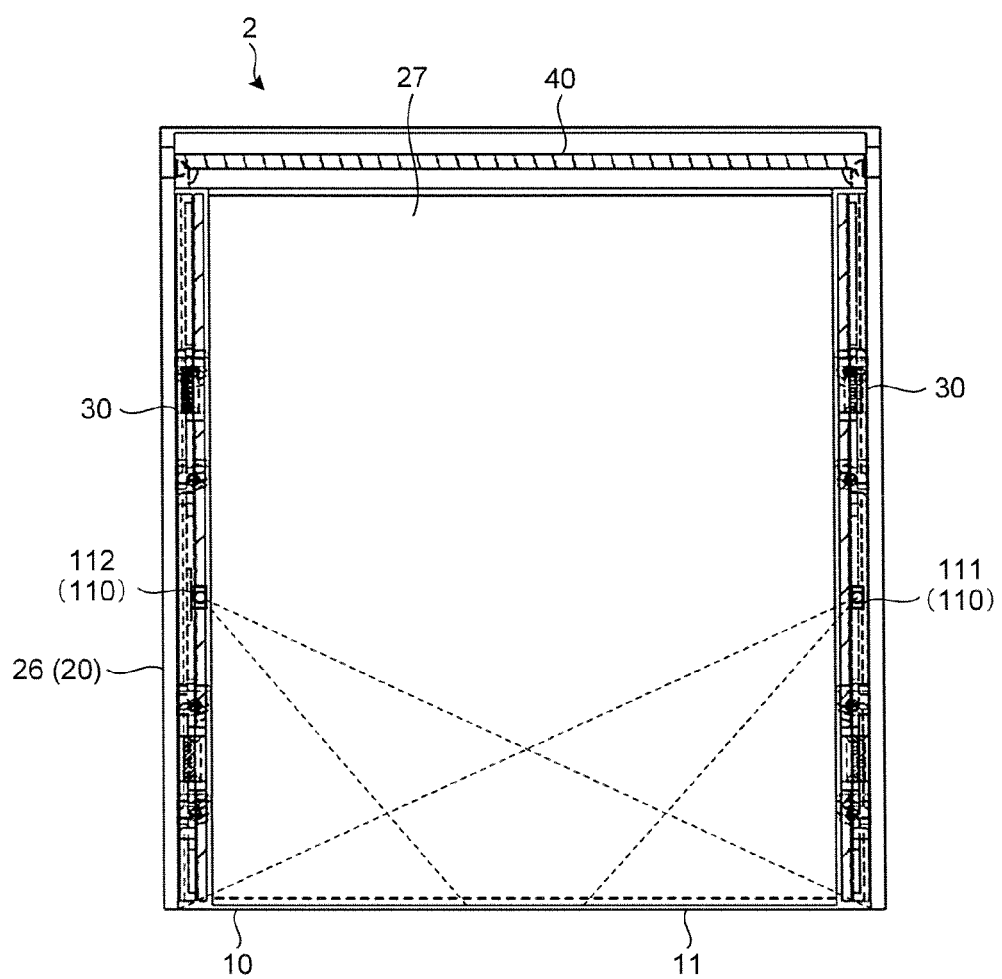
FIG. 28 is a cross-sectional view taken along line G-G in FIG. 27.

Further, in the image reading apparatus 1 according to the first embodiment, the light sources disposed at the housing 2 are formed as the light-emitting module in which the plurality of light emitting devices is arrayed, but the light source may also be formed in a manner other than this configuration. FIG. 27 is an explanatory diagram illustrating a modified example of the image reading apparatus according to the first embodiment, and is an explanatory diagram for the case where a light source is formed of a point light source. FIG. 28 is a cross-sectional view taken along line G-G in FIG. 27. A light source 110 disposed on an inner surface side of the housing 2 may be formed as the point light source as illustrated in FIGS. 27 and 28. In other words, one light source 110 may be formed of one light emitting device. In the case of forming the light source 110 as the point light source also, the light source 110 includes first light sources 111 and second light sources 112. The first light sources 111 are disposed at one connecting-cover portion 30 out of the two connecting-cover portions 30, and the second light sources 112 are disposed at the other connecting-cover portion 30 out of the two connecting-cover portions 30.

The first light sources 111 and the second light sources 112 are disposed at each of the two swing members 31 included in respective one of connecting-cover portions 30. More specifically, the first light sources 111 are disposed in each of the two swing members 31 included in the connecting-cover portion 30 on the side where the first light sources 111 are disposed, and the second light sources 112 are disposed in each of the two swing members 31 included in the connecting-cover portion 30 on the side where the second light sources 112 are disposed.

The first light sources 111 can emit the light to a position on the opening portion 11 close to the connecting-cover portion 30 where the second light sources 112 are disposed, and the second light sources 112 can emit the light to a position on the opening portion 11 close to the connecting-cover portion 30 where the first light sources 111 are disposed. With this configuration, even in the case where the light emitted from the light sources 110 is specularly reflected at the medium P and the light specularly reflected enters the image capturing unit 70 at the time of reading the medium P, the image having no reflection from the light sources 110 can be obtained by combining the image captured while only the first light sources 111 are turned on with the image captured while only the second light sources 112 are turned on. In case where the sufficient light amount to properly read the medium P can be secured even in the case where the light sources 110 are formed of the point light sources, the light sources 110 may be formed of the point light sources as described above.

Figure 29:
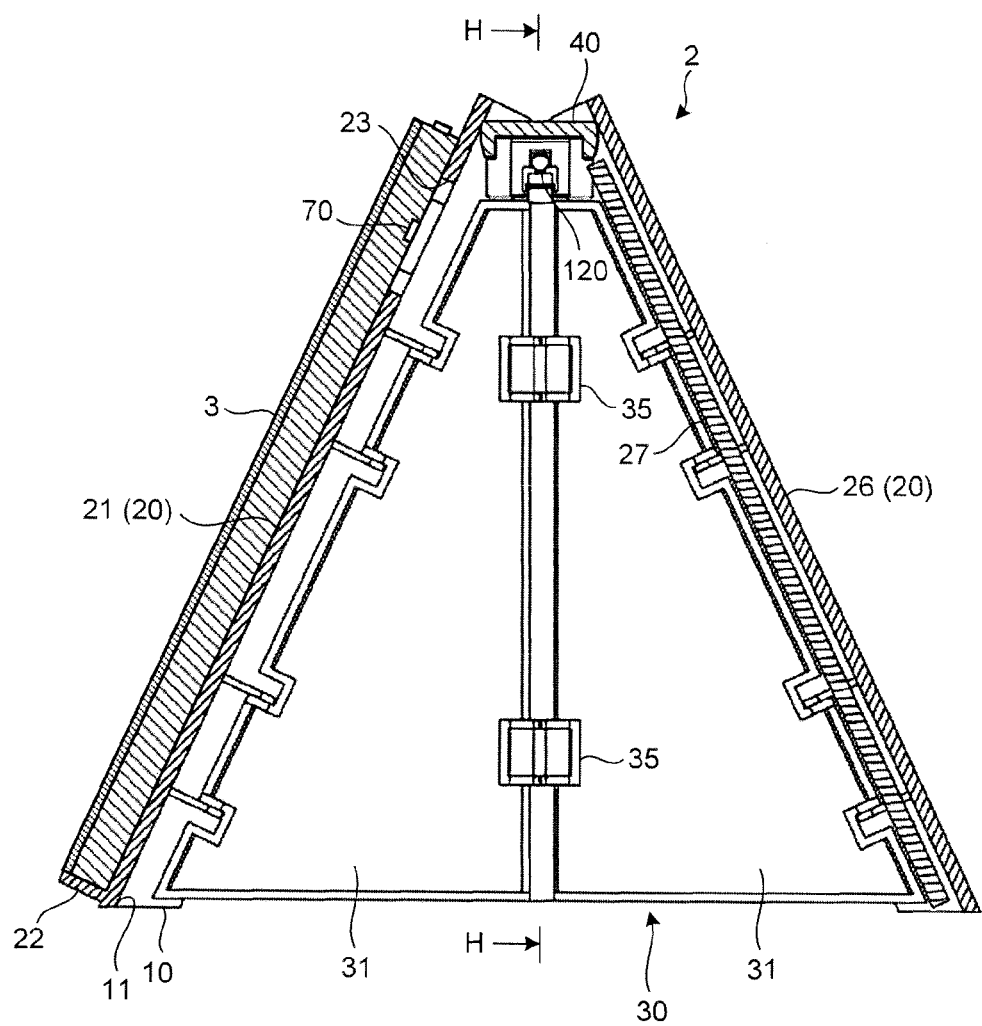
FIG. 29 is an explanatory diagram illustrating a modified example of the image reading apparatus according to the first embodiment and is an explanatory diagram for the case where the light source is disposed at a rotatable-cover portion.
Figure 30:
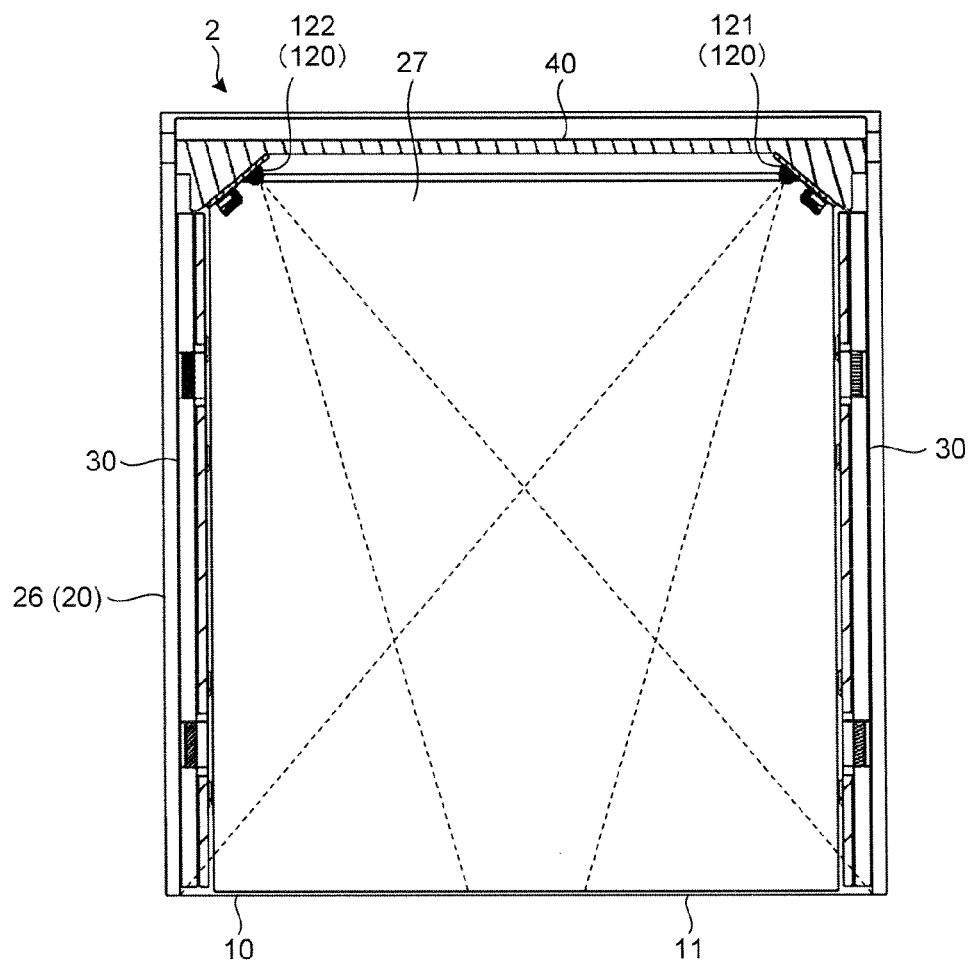
FIG. 30 is a cross-sectional view taken along line H-H in FIG. 29.

Further, the light source disposed at the housing 2 may be disposed in a place other than the connecting-cover portion 30. FIG. 29 is an explanatory diagram illustrating a modified example of the image reading apparatus according to the first embodiment, and is an explanatory diagram for a case where the light source is disposed at the rotatable-cover portion. FIG. 30 is a cross-sectional view taken along line H-H in FIG. 29. A light source 120 disposed on an inner surface side of the housing 2 may be disposed, for example, at the rotatable-cover portion 40 as illustrated in FIGS. 29 and 30. More specifically, the light source 120 includes a first light source 121 and a second light source 122, and the first light source 121 and the second light source 122 are disposed on a lower surface side of the rotatable-cover portion 40, i.e., on inner surface side of the housing 2, and near both ends of the rotatable-cover portion 40. In other words, the first light source 121 is disposed on one end side of the rotatable-cover portion 40, and the second light source 122 is disposed on the other end side of the rotatable-cover portion 40.

These first light source 121 and second light source 122 have different irradiating directions, and the first light source 121 can emit the light to a position on the opening portion 11 close to the connecting-cover portion 30 located at the end portion side of the rotatable-cover portion 40 on the side where the second light source 122 is disposed. Further, the second light source 122 can emit the light to a position on the opening portion 11 close to the connecting-cover portion 30 located at the end portion side of the rotatable-cover portion 40 on the side where the first light source 121 is disposed.

Thus, by making the irradiating directions of the first light source 121 and the second light source 122 different, an image having no reflection of the light sources 120 can be obtained at the time of reading the medium P even in the case where the light sources 120 are disposed at the rotatable-cover portion 40. Thus, the light sources 120 may be disposed at a place other than the connecting-cover portion 30 as long as the image having no reflection from the light source 120 can be obtained at the place.

Further, according the above-described first embodiment and modified examples, it has been described that the light sources are disposed at two places, but the light sources may be disposed at three or more places. In this case, the number of the generated image data is the number of the light sources individually turned on because the image capturing unit 70 captures the image of the medium P via the opening portion 11 by turning on each of the light sources. However, preferably, the image processing unit 76 generates combined image data DG by extracting image data having no reflection generated out of the respective image data. Further, according to the above-described first embodiment, the case where only one light source out of the plurality of light sources 50 is turned on every time the image is captured by the image capturing unit 70 has been described, but the plurality of light sources may be turned on as long as the light can be emitted to different areas on the horizontal surface of the opening portion 11. Additionally, although the above-described first embodiment recites the case where all of the plural light sources 50 are turned on when the landing sensor 55 is ON, at least one or more light sources 50 may be turned on when the landing sensor 55 is ON.

Further, in the image reading apparatus 1 according to the first embodiment, it has been described that the battery such as the primary battery or the secondary battery is used as the power source 56, but the power source 56 may be a power source other than the battery. The power source 56 may be, for example, commercial power supply, solar power generation, a power source unit mounted on the external device 3, etc. whereby power is supplied to the respective devices in the housing 2 from an external power source of the housing 2.

Further, in the image reading apparatus 80 according to the second embodiment, the second inclined-cover portion 90 is configured such that the length thereof can be changed, but a length to be changed does not have to be the second inclined-cover portion 90. The first inclined-cover portion 21 may also be configured such that the length thereof in the direction from the end portion on the side where the opening portion 11 is located to the end portion on the other side can be changed. By configuring the inclined-cover portions 20 such that the length of at least one of the two inclined-cover portions 20 can be changed, portability of the image reading apparatus 80 can be secured and the image can be read with higher image quality.

An image reading apparatus according to the present invention is capable of reading an image, securing portability and ensuring image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
    a housing to block ambient light, the housing including an opening portion on a bottom surface;
    an image capturing unit configured to capture an image of a medium exposed to an inner portion of the housing at the opening portion; and
    a plurality of light sources disposed at the inner portion of the housing and emitting light to the opening portion to irradiate different areas on a horizontal surface of the opening portion, wherein
    the opening portion is formed in a rectangular shape,
    the housing includes four cover portions corresponding to sides of the opening portion,
    the four cover portions include two pairs of cover portions, each pair of the two pairs of cover portions includes two cover portions facing each other, one pair of the cover portions out of the two pairs of the cover portions constitute inclined-cover portions such that each of the one pair of the cover portions is inclining in a direction approaching toward other one of the one pair of the cover portions along a direction from a side where the opening portion is located to an end portion side on other side,
    other pair of the cover portions out of the two pairs of the cover portions is formed of connecting-cover portions configured to connect the two inclined-cover portions,
    the two inclined-cover portions can be switched between an open state and a folded state by one of the inclined-cover portions relatively moving with respect to the other inclined-cover portion, basing the end portion sides on the opposite side of the side where the opening portion is located, and in the open state, the end portions on the opening portion side of both of the inclined-cover portions are separated, and in the folded state, both of the inclined-cover portions are oriented in parallel and adjacent to each other, and
    the two connecting-cover portions are connected to the inclined-cover portions in a transformable manner, and when the two inclined-cover portions are in the folded state, the connecting-cover portions enter gap between the inclined-cover portions by being transformed with respect to the inclined-cover portions.

2. The image reading apparatus according to claim 1, wherein the two inclined-cover portions are switched between the open state and the folded state by respectively rotating around different rotary axes.

3. The image reading apparatus according to claim 1, wherein the two inclined-cover portions are switched between the open state and the folded state by being rotated around a shared rotary axis.

4. The image reading apparatus according to claim 1, wherein each of the connecting-cover portions includes a plurality of swing members mutually connected in a swingable manner, and when the connecting-cover portions enter the gap between the inclined-cover portions by being transformed with respect to the inclined-cover portions at the time of setting the two inclined-cover portions in the folded state, the connecting-cover portions are oriented parallel to the two inclined-cover portions by the swing members being relatively swung each other.

5. The image reading apparatus according to claim 1, wherein the connecting-cover portions are made of flexible members, and when the connecting-cover portions enter the gap between the inclined-cover portions by being transformed with respect to the inclined-cover portions at the time of setting the two inclined-cover portions in the folded state, the connecting-cover portions are oriented parallel to the two inclined-cover portions by being bent.

6. The image reading apparatus according to claim 1, wherein at least one of the two inclined-cover portions has a changeable length in the direction from the end portion on a side where the opening portion is located to an end portion on the other side.

* * * * *